US007351062B2

(12) United States Patent
Gordon et al.

(10) Patent No.: US 7,351,062 B2
(45) Date of Patent: Apr. 1, 2008

(54) EDUCATIONAL DEVICES, SYSTEMS AND METHODS USING OPTICAL CHARACTER RECOGNITION

(75) Inventors: Gayle E. Gordon, Naperville, IL (US); Victor Kwok-ho Ng, Kowloon (HK); Barbara E. Plain, Winnetka, IL (US); Po Man Yuen, Tai Po (HK)

(73) Assignee: Learning Resources, Inc., Vernon Hills, IL (US)

( * ) Notice: Subject to any disclaimer, the term of this patent is extended or adjusted under 35 U.S.C. 154(b) by 0 days.

(21) Appl. No.: 11/311,527

(22) Filed: Dec. 19, 2005

(65) Prior Publication Data

US 2006/0188852 A1 Aug. 24, 2006

Related U.S. Application Data

(60) Provisional application No. 60/637,175, filed on Dec. 17, 2004.

(51) Int. Cl.
*G09B 17/00* (2006.01)

(52) U.S. Cl. ...................... 434/178; 434/156; 434/167; 434/171; 434/172; 434/175; 434/322; 434/323

(58) Field of Classification Search ................ 434/178, 434/167, 171, 172, 175, 156, 323
See application file for complete search history.

(56) References Cited

U.S. PATENT DOCUMENTS

| 1,151,279 A | 8/1915 | Lewis |
| 1,428,206 A | 9/1922 | Benton |
| 1,542,031 A | 6/1925 | Bruhn |
| 1,649,578 A | 11/1927 | Deming |
| 2,386,114 A | 10/1945 | Hayes |

(Continued)

FOREIGN PATENT DOCUMENTS

BR   8502207   5/1985

(Continued)

OTHER PUBLICATIONS

Larson-Rutter, Emily and Lapp, Shelley, "Unifix Phonics Activities (Grades 1-3)", World Teachers Press, © 2000 Didax Educational Resources (ISBN 1-58324-043-8), entire workbook.

(Continued)

*Primary Examiner*—Robert Pezzuto
*Assistant Examiner*—Milap Shah
(74) *Attorney, Agent, or Firm*—Michael Best & Friedrich LLP

(57) ABSTRACT

Educational devices, educational systems, and methods of teaching and learning reading are provided. The devices, systems, and methods can include an indicium reader, such as an optical character recognition device, for reading indicium from objects. Such objects can be three-dimensional blocks and the indicium can be a letter, word, sentence, number, or some other type of readable character(s). The devices, systems, and methods can include a display for displaying the read indicium and an audio producing device for producing audio corresponding to the read indicium. The educational devices can be a self-contained, portable unit with the indicium reader, the display, and the audio producing device supported by a housing of the educational devices.

30 Claims, 19 Drawing Sheets

U.S. PATENT DOCUMENTS

| | | |
|---|---|---|
| 2,494,469 A | 1/1950 | Booth |
| 2,611,193 A | 9/1952 | Davis |
| 2,835,988 A | 5/1958 | Hilkene |
| 2,987,833 A | 6/1961 | Stolphen |
| 3,094,792 A | 6/1963 | Morgan |
| 3,171,217 A | 3/1965 | Birdsall |
| 3,204,343 A | 9/1965 | Pollock |
| 3,414,986 A | 12/1968 | Stassen |
| 3,469,325 A | 9/1969 | Greenberg |
| 3,478,446 A | 11/1969 | McCutcheon |
| 3,636,230 A | 1/1972 | Tacey |
| 3,728,800 A | 4/1973 | Magram |
| 3,903,617 A | 9/1975 | Evans |
| 4,014,548 A | 3/1977 | Trilling |
| 4,044,476 A | 8/1977 | Marsh |
| 4,282,674 A | 8/1981 | Hanson et al. |
| 4,307,534 A | 12/1981 | Tomita |
| 4,637,799 A | 1/1987 | Bouchal |
| 4,773,098 A * | 9/1988 | Scott .................. 382/198 |
| 4,778,392 A | 10/1988 | Mitchell |
| 4,829,580 A | 5/1989 | Church |
| 4,914,019 A | 4/1990 | Chu |
| 4,959,017 A | 9/1990 | Thompson et al. |
| 4,968,255 A | 11/1990 | Lee et al. |
| 4,973,287 A | 11/1990 | Martin |
| 5,137,452 A | 8/1992 | Pollock |
| 5,176,577 A | 1/1993 | Pollock |
| 5,212,368 A | 5/1993 | Hara |
| 5,238,407 A | 8/1993 | Pollock |
| 5,238,408 A | 8/1993 | Pollock |
| 5,252,814 A * | 10/1993 | Tooley .................. 235/383 |
| 5,297,965 A | 3/1994 | Manancero |
| 5,314,336 A * | 5/1994 | Diamond et al. .......... 434/169 |
| 5,349,129 A | 9/1994 | Wisniewski et al. |
| 5,447,433 A | 9/1995 | Perry |
| 5,476,407 A | 12/1995 | Hall, Jr. |
| 5,511,980 A | 4/1996 | Wood |
| 5,554,062 A | 9/1996 | Goldsen |
| 5,567,159 A | 10/1996 | Tehan |
| 5,795,163 A | 8/1998 | Alioto |
| 5,823,782 A | 10/1998 | Marcus et al. |
| 5,833,465 A | 11/1998 | Jarzewiak |
| 5,875,428 A | 2/1999 | Kurzweil et al. |
| 5,945,656 A | 8/1999 | Lemelson et al. |
| 5,959,281 A | 9/1999 | Domiteaux |
| 5,991,693 A | 11/1999 | Zalewski |
| 6,014,464 A | 1/2000 | Kurzweil et al. |
| 6,052,663 A | 4/2000 | Kurzweil et al. |
| D424,547 S | 5/2000 | Seachuga |
| 6,068,487 A | 5/2000 | Dionne |
| 6,074,212 A | 6/2000 | Cogliano |
| 6,089,943 A | 7/2000 | Lo |
| 6,104,845 A | 8/2000 | Lipman et al. |
| 6,170,750 B1 | 1/2001 | Ueno |
| 6,173,264 B1 | 1/2001 | Kurzweil et al. |
| 6,199,042 B1 | 3/2001 | Kurzweil |
| 6,218,964 B1 | 4/2001 | Ellis |
| 6,247,934 B1 | 6/2001 | Cogliano |
| 6,267,248 B1 * | 7/2001 | Johnson et al. ............ 209/547 |
| 6,270,013 B1 | 8/2001 | Lipman et al. |
| 6,409,511 B2 | 6/2002 | Cogliano |
| 6,464,503 B1 | 10/2002 | Heit et al. |
| 6,607,388 B2 | 8/2003 | Cogliano |
| 6,608,618 B2 | 8/2003 | Wood et al. |
| RE38,286 E | 10/2003 | Flowers |
| 6,641,401 B2 | 11/2003 | Wood et al. |
| 6,648,647 B2 | 11/2003 | Wood et al. |
| 6,668,156 B2 | 12/2003 | Lynch et al. |
| 6,685,477 B1 * | 2/2004 | Goldman et al. ........... 434/172 |
| 6,697,602 B1 | 2/2004 | Ferrigno et al. |
| 6,726,485 B2 | 4/2004 | Marcus et al. |
| 6,729,881 B2 | 5/2004 | Marcus et al. |
| 6,739,874 B2 | 5/2004 | Marcus et al. |
| 6,750,978 B1 | 6/2004 | Marggraff et al. |
| 6,755,655 B2 | 6/2004 | Marcus et al. |
| 7,040,898 B2 * | 5/2006 | Marcus et al. .............. 434/322 |
| 2002/0028710 A1 | 3/2002 | Ishihara et al. |
| 2002/0029146 A1 | 3/2002 | Nir |
| 2002/0078363 A1 | 6/2002 | Hill |
| 2002/0125324 A1 | 9/2002 | Yavid et al. |
| 2002/0160340 A1 | 10/2002 | Marcus et al. |
| 2003/0025505 A1 | 2/2003 | Lam |
| 2003/0027108 A1 | 2/2003 | Marcus et al. |
| 2003/0121978 A1 | 7/2003 | Rubin et al. |
| 2003/0148249 A1 | 8/2003 | Marcus et al. |
| 2003/0151194 A1 * | 8/2003 | Hessing et al. ......... 273/149 R |
| 2003/0158677 A1 | 8/2003 | Swarztrauber et al. |
| 2003/0171063 A1 | 9/2003 | Soto et al. |
| 2004/0063078 A1 | 4/2004 | Marcus et al. |
| 2004/0063079 A1 | 4/2004 | Marcus et al. |
| 2004/0121293 A1 | 6/2004 | Marcus et al. |
| 2004/0142308 A1 | 7/2004 | Marcus et al. |
| 2004/0142309 A1 | 7/2004 | Marcus et al. |
| 2004/0142310 A1 | 7/2004 | Marcus et al. |
| 2004/0142311 A1 | 7/2004 | Marcus et al. |
| 2004/0197749 A1 * | 10/2004 | Goldman et al. ........... 434/172 |
| 2004/0212642 A1 * | 10/2004 | Silverbrook .................. 347/3 |
| 2005/0227209 A1 * | 10/2005 | Von Ridder et al. ........ 434/156 |

FOREIGN PATENT DOCUMENTS

| | | |
|---|---|---|
| DE | 1954660 | 2/1967 |
| DE | 7730826 | 1/1978 |
| DE | 3323588 | 8/1984 |
| DE | 9003865.7 | 1/1992 |
| EP | 0310766 | 4/1989 |
| FR | 2410319 | 11/1977 |
| FR | 2356220 | 11/1978 |
| GB | 744850 | 2/1956 |
| GB | 1372163 | 10/1974 |
| GB | 2255915 | 11/1992 |
| JP | 2001312275 | 11/2001 |
| JP | 2003190662 | 7/2003 |

OTHER PUBLICATIONS

Pictures of Lakeshore and LDA products: LA-226, Hands-on Sentence Building Cubes; LA-363, Phonics Magnetic kit; RR-285, Build-A-Word Cubes; LC-1639, Magnetic Story Board; LL01114, Three, Four, Five.

ETA K-6 Reading Language Arts 2000 catalog, pp. 1-6, 12-16, 22-26, 34, 41.

Pictures of products: Celebration Alphasnaps Package, No. 1-574-52254-X and Alphasnaps and Snap Cube Sets, No. 1-574-52253-1; Chunks—The Incredible Word Building Game.

Webpages showing Phonics Tiles and Trays Set, and Lots O'Tiles Set.

Webpages of Hasbro & Parker Brothers "Boggle" game.

Webpage of "Rainbow Fraction Tiles", manufactured by Learning Resources, Inc. of Lincolnshire, Illinois (1992).

Webpage of "Fraction Stax®", manufactured by Ideal School Supply Company, Oak Lawn, Illinois (1992).

Webpage of "Fraction Bars", manufactured by Scott Resources of Fort Collins, Colorado (1991).

Complaint filed May 10, 2004 in Civil Action No. 04-10926 MLW, captioned, *Didax, Incorporated* vs. *ETA/Cuisenaire*, a division of A. Daigger & Company, Incorporated, in the United States District Court, District of Massachusetts.

Pat & Fred Industrial Co., Ltd Item No. 9618 Scanner Cash Register Package.

Voice'N Sound Smart Cash Register Package.

Photos and a copy of the user's manual for the "Alphabet Apple™", produced by Scholastic Inc. at least as early as 2003.

Photos and a copy of a parent's guide for Fisher-Price® "Power Touch™" Learning System, produced by Fisher-Price, Inc. at least as early as 2003.

Photos and a copy of a parent's guide and instructions for "Leap's Phonics Library", produced by Leap Frog Enterprises, Inc. at least as early as 2003.

Photos and a copy of a user's manual for "Mini Talking School", marketed by Wal-Mart Stores, Inc.

* cited by examiner

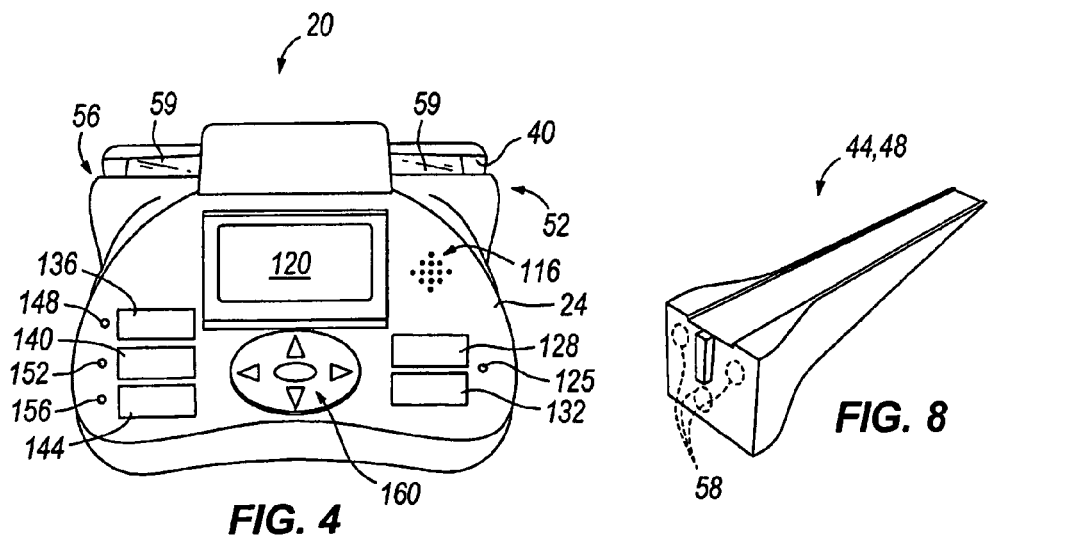
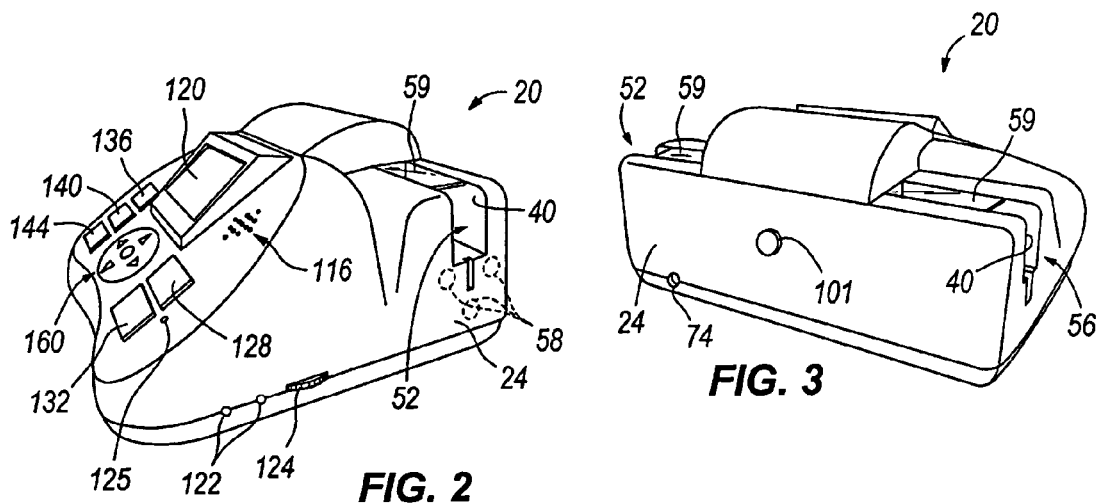
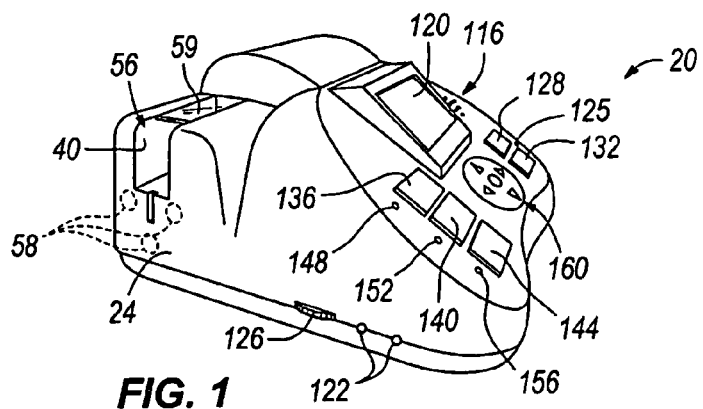

EDUCATIONAL DEVICES, SYSTEMS AND METHODS USING OPTICAL CHARACTER RECOGNITION

RELATED APPLICATIONS

The present application claims the benefit of now abandoned Provisional Patent Application No. 60/637,175, filed Dec. 17, 2004, the entire contents of which are hereby incorporated by reference.

FIELD OF THE INVENTION

This invention relates generally to educational devices, systems and methods for teaching and learning reading and, more particularly, to educational devices, systems, and methods using an optical character recognition (OCR) device for teaching and learning reading.

BACKGROUND OF THE INVENTION

Educational apparatuses come in a variety of configurations, shapes and sizes and educate users, such as young children, in a variety of manners. One educational area of great importance for educational apparatuses is reading, because reading skills are considered an essential building block of learning and is a "gateway" skill for acquisition of educational content and concepts in other subject areas.

Some educational apparatuses include a plurality of signal-emitting manipulative devices having educational information thereon for manipulation by a user, and a processing device for interpreting the educational information on the manipulative devices. The user commonly arranges the manipulative devices in a predetermined manner to form, for example, a word or a sentence. Each of the manipulative devices includes electrical or magnetic components that emit a signal receivable by a receiver of the processing device. The processing device then interprets the signals, and words or pictures are displayed on a monitor and/or converted to an audio signal corresponding to the interpreted signal.

Other educational apparatuses include a plurality of manipulative devices and a processing device for interpreting the educational information on the manipulative device and rely upon physical engagement between the manipulative devices and the processing device to "read" the information on the manipulative devices. The manipulative devices commonly include coding, e.g., bumps or mechanical keying on a surface thereof that is engagable with a code reading device or can be read electrically, such as by electromagnetic emissions, to represent information that can be read from the manipulative device and transferred to the processing device. The processing device subsequently interprets the coding from the manipulative devices and can display information and/or produce an audio signal corresponding to the educational information on the manipulative device.

Yet other educational apparatuses use barcode readers or other code readers. Such readers are typically hand-held and are often used in combination with a readable medium such as a book or other literary device having barcodes or other coded material thereon. The readers are brought into contact with or positioned closely over the barcodes or other coded material and moved thereover to read or identify the barcodes or coded material. The readers are commonly connected to a separate PC (Personal Computer) or other processing device to display the identified word(s) on a separate monitor or to create an audio sound corresponding to the identified barcode or coded material.

Still other educational apparatuses include supplemental material, such as a book or an activity card, and a central processing unit ("CPU"). The user uses the CPU to identify the supplemental material by keying information unique to the supplemental material into the CPU. Once the CPU identifies the supplemental material, the educational apparatus operates according to the preprogrammed information of the identified supplemental material. In other words, operation of the educational apparatus is dependent upon the identified supplemental material, and operation of the educational apparatus is limited by the preprogrammed parameters of the supplemental material. In some constructions of such educational apparatuses, the educational apparatus includes a stylus interactable with the supplemental material to complete an electrical circuit at a particular point on a grid of the supplemental material. When the electrical circuit is completed, a single specific response is provided.

Some educational apparatuses are used to translate languages and employ an optical character recognition ("OCR") device to recognize the material to be translated. Such OCR devices are used in combination with a PC or other type of computer because of the large storage and memory capabilities required for performing the OCR and translation operations. The educational apparatuses with OCR capabilities require connection to the PC or other external processing device to display the identified words on a separate monitor or to create an audio sound corresponding to the identified word and the like.

SUMMARY OF THE INVENTION

In some constructions, a method of teaching and learning reading is provided, the method using a group of objects bearing a type of reading indicia on an indicium-bearing face, the type of reading indicia being one or more letters readable by both a human user and an optical reader device, the method including selecting a first and a second object from the group of universally connectable objects, selecting an indicium-bearing face of the first object and an indicium-bearing face of the second object, connecting the first object and the second object so that the connected objects are horizontally adjacent and the selected indicia-bearing faces of each object are visible from the same direction, and scanning the selected indicia of the connected objects with the optical reader device to visually display and/or audibly pronounce the indicia, and to determine whether the indicia appear together to form an intelligible reading unit.

In other constructions, a system for teaching and learning reading and language acquisition is provided, the system including a group of universally connectable objects bearing a type of reading indicia on an indicium-bearing face readable by a human user, an optical reader device for scanning and recognizing the type of reading indicia as being one or more letters, readable by the human user, the group of universally connectable objects including at least a first object for having a plurality of indicium-bearing faces, and a second object having a plurality of second indicium-bearing faces, the group of universally connectable objects being connectable so that the connected objects are horizontally adjacent and selected indicia-bearing faces of each object are visible from the same direction, and a feeder for receiving the connected objects into the optical reader device for scanning the indicia on the selected indicia-bearing faces of the connected objects, whereby the information on the connectable objects is visually displayed on a screen and audibly pronounced through a speaker, and a determination can be made whether the indicia appear together to form an intelligible reading unit.

In further constructions, an educational device is provided and includes a housing, an optical character recognition device supported by the housing, a display supported by the housing, and a processor supported by the housing.

In further yet constructions, an educational system is provided and includes an object bearing an indicium readable by a user, a housing, an optical character recognition device supported by the housing for optically recognizing the indicium on the object, a display supported by the housing for displaying the indicium, and a processor supported by the housing for reproducing the optically recognized indicium on the display.

In additional constructions, an educational device is provided and includes a housing, an indicium reader supported by the housing for reading an indicium on an object, an audio producing device supported by the housing for producing audio corresponding to the indicium on the object, and a processor supported by the housing for communicating the indicium to the audio producing device such.

In other constructions, an educational device is provided and includes a housing, an indicium reader supported by the housing for reading an indicium on an object when the object is in a reading position, and a transporter supported by the housing for moving the object.

In further constructions, a method of teaching and learning reading is provided, the method includes providing an object bearing an indicium readable by a user, providing an educational device including an indicium reader and a display, feeding the object into the educational device, reading the indicium of the object with the indicium reader, and displaying the indicium on the display of the educational device.

BRIEF DESCRIPTION OF THE DRAWINGS

FIG. 1 is a front, left perspective view of an educational device.

FIG. 2 is a front, right perspective view of the educational device shown in FIG. 1.

FIG. 3 is a rear perspective view of the educational device shown in FIG. 1.

FIG. 4 is a top view of the educational device shown in FIG. 1.

FIG. 8 is a perspective view of a bridge of the educational device shown in FIG. 5.

Figure 9:
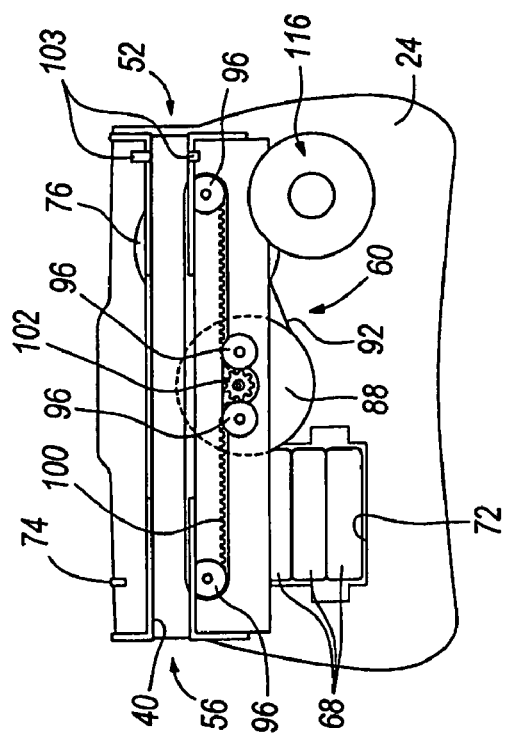
FIG. 9 is a partial top view of the educational device shown in FIG. 1, with a front cover of the educational device removed.
Figure 10:
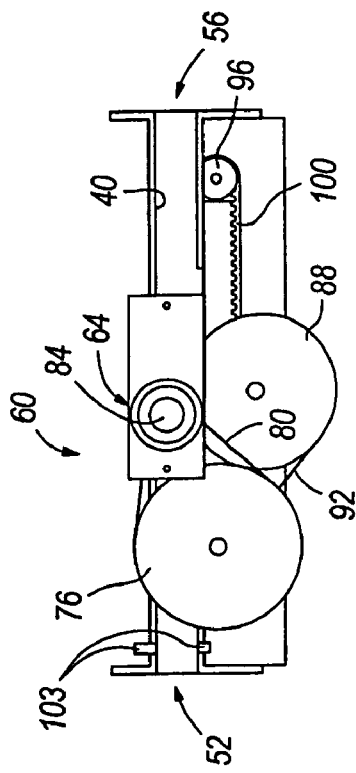
FIG. 10 is a bottom view of a conveying assembly of the educational device shown in FIG. 1, with the rear and bottom cover removed.
Figure 5:
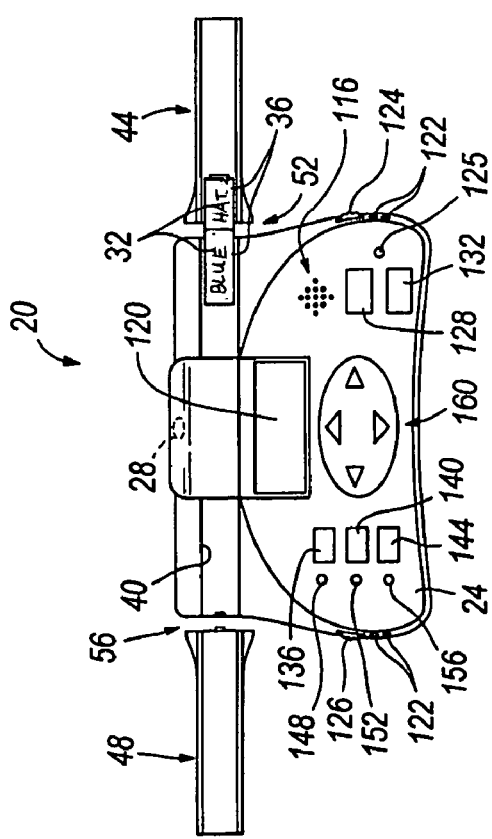
FIG. 5 is another top view of the educational device shown in FIG. 1, shown with bridges and objects.
Figure 11:
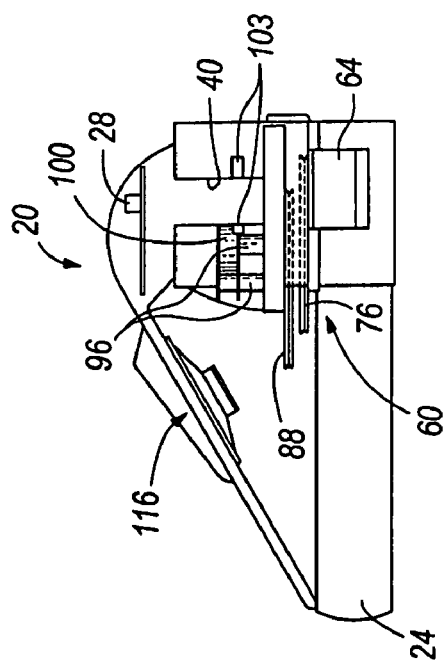
FIG. 11 is a side view of the educational device shown in FIG. 1, shown partially broken to expose some of the interior components of the educational device.
Figure 6:
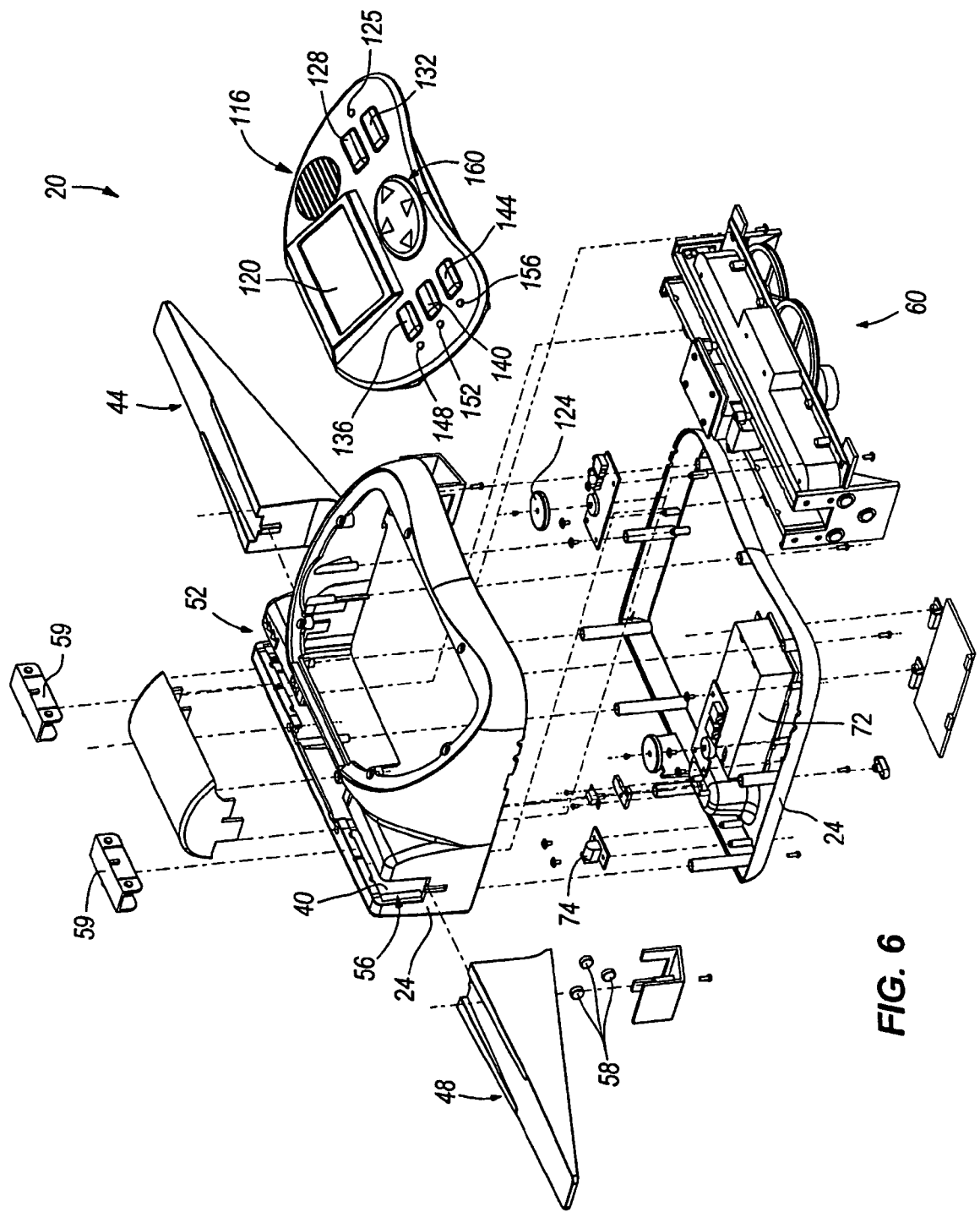
FIG. 6 is an exploded, left perspective view of the educational device shown in FIG. 1.
Figure 7:
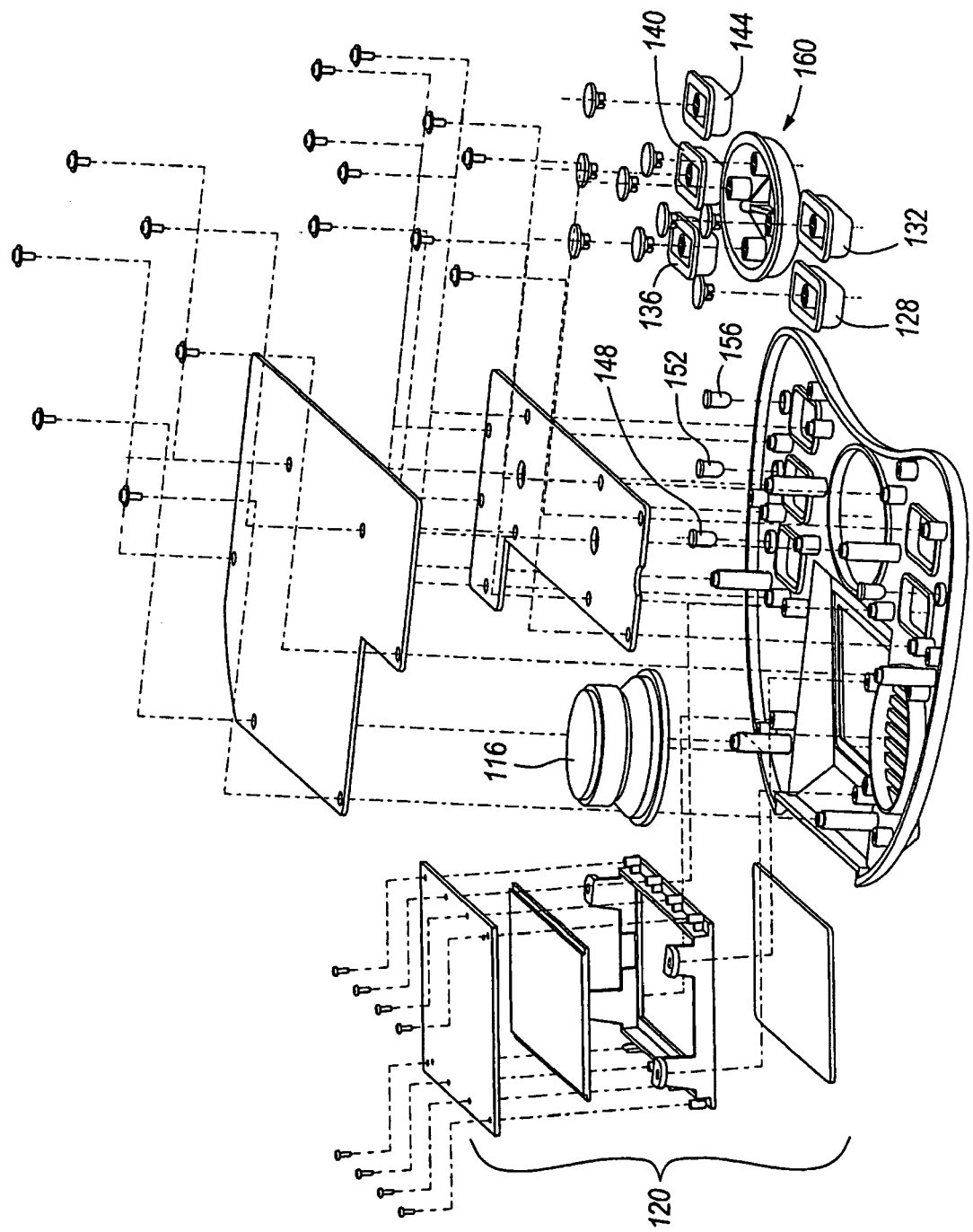
FIG. 7 is an exploded, bottom perspective view of a portion of the educational device shown in FIG. 1.
Figure 12:
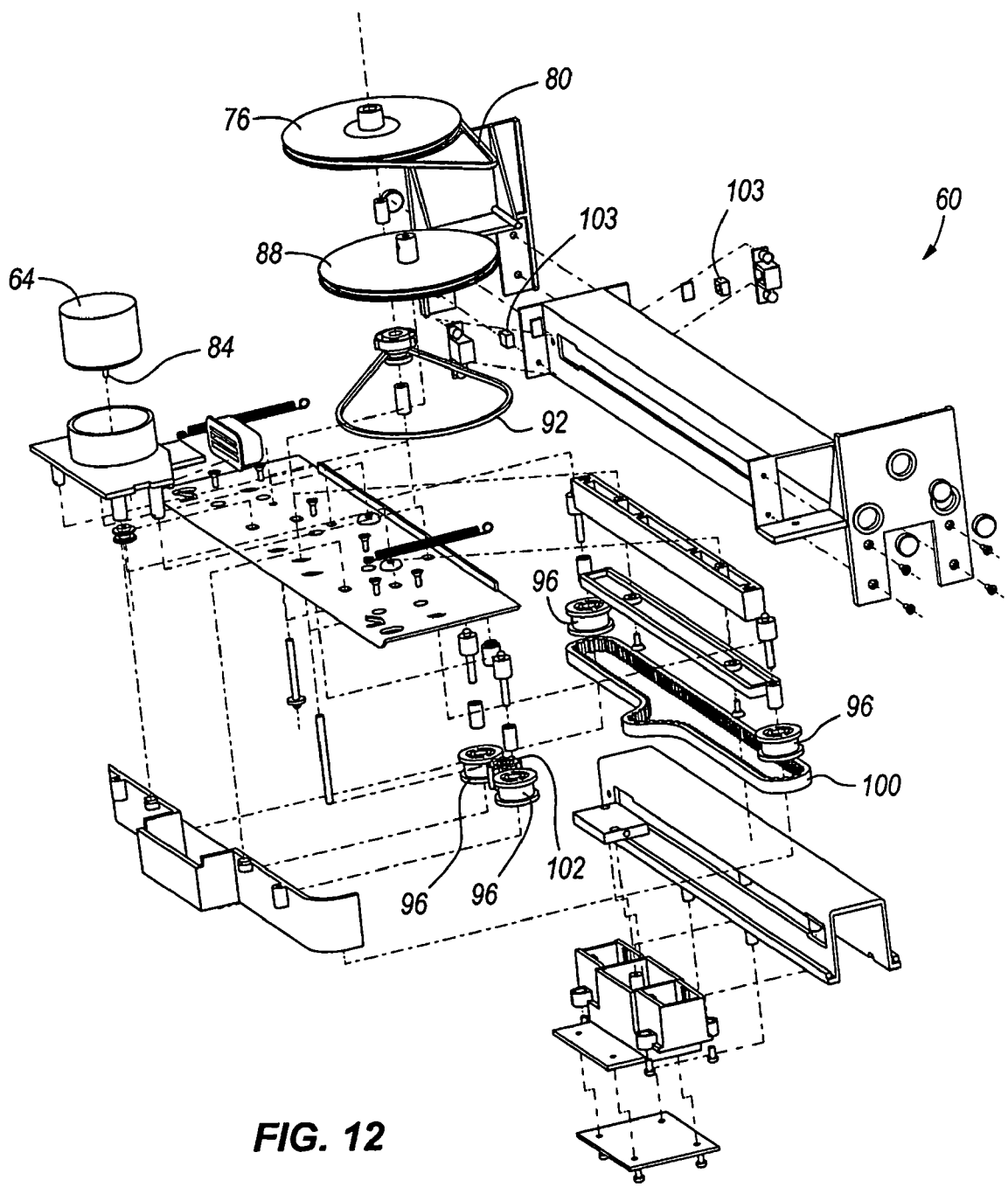
FIG. 12 is a bottom perspective view of the conveying assembly of the educational device shown in FIG. 1.

The invention is not limited in its application to the details of the construction and arrangements of the components set forth in the following description or illustrated in the drawings. The invention includes other embodiments and can be practiced or carried out in various different ways.

DETAILED DESCRIPTION

Figure 15A:
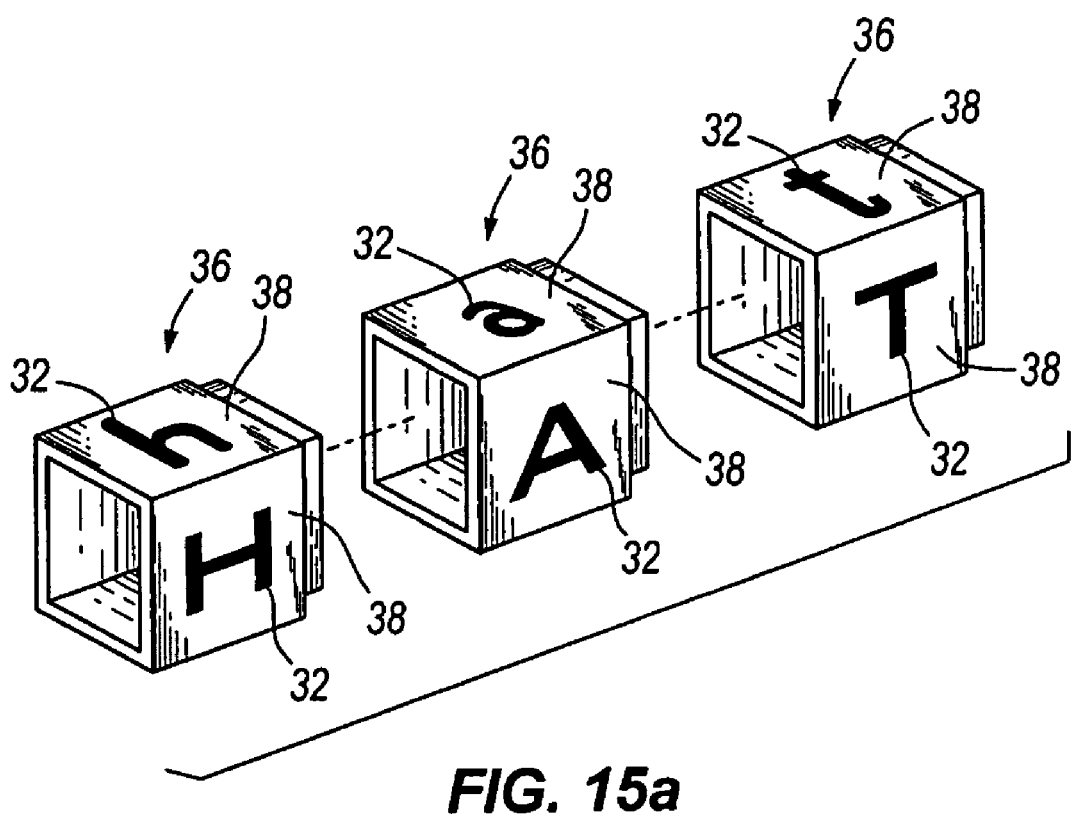
FIG. 15a is a perspective view of a plurality of objects.
Figure 15B:
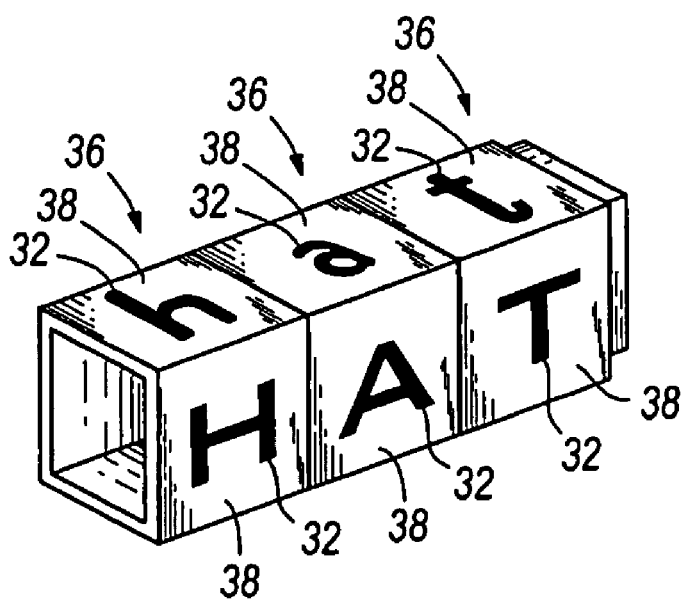
FIG. 15b is a perspective view of the objects in FIG. 15a, shown assembled.

With reference to FIGS. 1-6, an educational device 20 is illustrated and is operable to educate users, such as, for example young children and non-native language speakers, through the user's interaction with the device 20. With the educational device 20, a user can learn valuable reading, spelling and pronunciation skills. The device 20 includes a housing 24 and an indicium reader or detection device 28, such as an optical character recognition ("OCR") device, within or supported by the housing 24 for reading, detecting or optically recognizing information or indicia 32 on substantially three dimensional objects 36, which are feedable into the device 20 from the right and proceed to the left. This permits the OCR device 28 to read left to right (as one would do in English). It should be understood that the objects 36 can be fed into the device 20 in other manners, such as, for example from left to right, front to back, back to front, and still be within the spirit and scope of the present invention. In the illustrated construction and with reference to FIGS. 15a and 15b, the objects 36 are a plurality of universally connectable blocks bearing reading indicia as disclosed and defined in U.S. Pat. No. 6,685,477 to Goldman et al. entitled "Method and Apparatus for Teaching and Learning Reading" issued Feb. 3, 2004, the entire contents of which are hereby incorporated by reference. Alternatively, the OCR device 28 is operable to optically recognize other types of objects 36, such as, for example, tiles, other types of blocks, or other types of 3-dimensional objects, containing indicia 32 thereon. Also, the objects 36 can be made of a variety of materials, such as, for example, metal, paperboard, wood, etc. As discussed in U.S. Pat. No. 6,685,477 and shown in the illustrated construction, the objects 36 can be fed individually into the device 20 or can be connected by the user to form words and sentences, for example, and fed into the device 20 when connected. The objects 36 have indicium-bearing faces 38 such that when two objects 36 are connected, their indicium-bearing faces 38 are substantially co-planar and simultaneously visible from the same direction.

In the illustrated construction, the indicia 32 displayed on the indicium-bearing faces relates to English language characters. However, it should be understood that the indicia 32 can relate to any language and the educational device 20 is operable to identify characters or educational information of any such language and the device 20 would be appropriately configured to handle any such language. Also, it should be understood that the indicia 32 can relate to other types of information or symbols, such as numbers, shapes, patterns, mathematical symbols, etc. Objects 36 containing indicia 32 are fed into a feed channel 40 (discussed below), the indicia 32 are identified by the OCR device 28, and displayed on a display 120 (discussed below) in the same or even a different language. The indicia 32 on the objects 36 are any of a variety of reading indicia, including vowels, consonants, combinations of vowels and consonants, rhymes, words, parts of speech, word endings and certain punctuation marks. The objects 36 are also capable of bearing Braille indicia or other types of indicia for use by blind users. In some constructions, the Braille indicia are integrally formed on the surface of the objects 36. In other constructions, the Braille indicia are attached to the objects 36 after formation of the objects 36. In such constructions, the Braille indicia can be selectively connected to the surface of the objects 36, such as by adhesive tape, fasteners, etc., or can be permanently connected to the surface of the objects 36, such as by welding, brazing, gluing, etc.

The OCR device 28 is of common construction and includes an optical reader or camera for scanning and translating human readable characters (indicia on objects 36 in the present application) into bitmap images or a pattern of dots. The OCR device 28 operates with optical character recognition software (stored in a CPU 104, discussed below), which recognizes the bitmap images and produces an OCR data file with generated text information from the bitmap images. OCR is the translation of optically scanned bitmaps of printed or written text characters into character codes, such as ASCII. This is an efficient way to turn characters into data files that can be edited and otherwise manipulated with a processor. The OCR data file is used by the OCR software to display a text-based representation of the scanned document on the display, and is also used with speech software.

With continued reference to FIGS. 1-6, the housing 24 defines a feed channel 40 along which the objects 36 are fed to a location within the housing 24 where the OCR device 28 scans the indicia 32 on the objects 36. It should be understood that in other constructions, the device 20 can include a movable camera that moves relative to stationary objects 36 to scan the indicia 32 on the objects 36.

Advantageously, the educational device 20 includes an infeed support bridge 44 and an outfeed support bridge 48 (see FIGS. 5, 6 and 8) aligned with an infeed end 52 and an outfeed end 56 of the feed channel 40, respectively, for supporting the objects 36 (also called "trains" when numerous objects 36 are connected together) upon infeeding into and outfeeding from the feed channel 40. In the illustrated construction, the infeed and outfeed support bridges 44, 48 are separate components from the housing 24 and are magnetically connected to the housing 24, inline with the feed channel 40, using mating magnets 58 (see FIGS. 1, 2 and 8) attached to both the bridges 44, 48 and the housing 24. In some constructions, the infeed and outfeed support bridges 44, 48 are separate components from the housing 24, are free-standing, and are positioned near and inline with the feed channel 40. In other constructions, the infeed and outfeed support bridges 44, 48 are integral with the housing 24 in a position aligned with the feed channel 40. In yet other constructions, the infeed and outfeed support bridges 44, 48 are selectively physically connectable with the housing 24, such as, for example by fasteners, Velcro, clip and groove, etc., in a position physically aligned with and in communication with the feed channel 40.

A cover 59 is positioned over each of the infeed end 52 and the outfeed end 56 to inhibit children's fingers, hair, or other inappropriate objects from entering the feed channel 40. The covers 59 are transparent to allow users to see within the feed channel 40 and watch the objects 36 as they are fed through the device 20. The covers 59 extend across the width of the channel 40, but do not extend the complete length of the channel 40. The covers 59 provide sufficient space around the infeed end 52 and the outfeed end 56 of the feed channel 40 to allow a user to manipulate the objects 36 into and out of the feed channel 40. Alternatively, the covers 59 can assume a variety of shapes and can extend any amount of the width and length of the feed channel 40 and still be within the spirit and scope of the present invention.

With reference to FIGS. 6 and 9-12, the educational device 20 also includes a transporter or conveying assembly 60 within housing 24 for transporting or conveying the objects 36 through the feed channel 40 and through a reading position where the OCR device 28 scans the indicia 32 on the objects 36. The conveying assembly 60 includes a motor 64 electrically connected to and powered by either a plurality of batteries 68 (see FIG. 9) positioned in a battery compartment 72 or an AC power source electrically connected to the motor 64 through an auxiliary power port 74 (see FIGS. 3 and 9). The conveying assembly 60 also includes a first transfer roller 76, a first belt 80 wrapped around the first transfer roller 76 and an output shaft 84 of the motor 64, a second transfer roller 88, a second belt 92 wrapped around the first transfer roller 76 and the second transfer roller 88, a plurality of guide rollers 96, and a conveying belt 100 wrapped around the guide rollers 96 and engaged by a toothed gear 102 of second transfer roller 88, which drives the conveying belt 100. A portion of the conveying belt's path is adjacent to the feed channel 40 to facilitate engagement between the conveying belt 100 and the objects 36 positioned in the feed channel 40. The conveying belt 100 presses the objects 36 against a back wall of the feed channel 40 and conveys the objects 36 through the housing 24 and past the OCR device 28. The back wall of the feed channel 40 can be made of, covered with, or coated with a material having low friction properties to facilitate movement of the objects 36 along the back wall of the feed channel 40 without substantial friction. Powering the motor 64 rotates the output shaft 84, thereby moving the belts and transfer rollers to ultimately move the conveying belt 100. In the event object(s) 36 are jammed in the feed channel 40, an ejector button 101 is pressed to allow the jammed object(s) 36 to be removed. Pressing the ejector button 101 releases the grip of the belt 100 on the object(s) 36.

The conveying assembly 60 has an activated condition, in which the motor 64 is powered to drive the belts and the transfer rollers, and a deactivated condition, in which the motor 64 is not powered and none of the belts or the transfer rollers move. The conveying assembly 60 can be controlled between the activated and deactivated conditions in a variety of manners.

In some constructions, the educational device 20 includes a sensor 103 positioned near the infeed end 52 of the feed channel 40 to sense the presence of objects 36 in the feed channel 40. Upon sensing the presence of the objects 36, the sensor 103 sends a signal to a CPU 104 (discussed below) and the CPU sends a signal to the conveying assembly 60 to switch it from the deactivated condition to the activated condition to cause the motor 64 to drive the belts and transfer rollers. The conveying belt 100 conveys the objects 36 through the feed channel 40 to the reading position in which the OCR device 28 scans the educational indicia 32. After the reading position, the conveying assembly 60 conveys the objects 36 toward the outfeed end 56 of the feed channel 40. Once the OCR device 28 scans all of the objects 36 and the objects are conveyed through the housing 24 toward the outfeed end 56 of the feed channel 40, the conveying assembly 60 switches to the deactivated condition. In some constructions, the educational device 20 includes a second sensor (not shown) near the outfeed end 56 of the feed channel 40. Upon sensing the absence of the objects 36 near the outfeed end 56 of the feed channel 40, the conveying assembly 60 switches to the deactivated condition. Alternatively in such constructions, the educational device 20 may include a timing sequence that initiates upon the absence of objects 36 sensed by the infeed end sensor, runs for a predetermined amount of time sufficient to enable the last sensed object 36 to be completely conveyed through the housing 24, and terminates upon exhaustion of the predetermined period of time to switch the conveying assembly 60 to the deactivated condition.

In other constructions, the conveying assembly 60 is controlled by manually activating a power switch to switch the conveying assembly 60 between the activated and deactivated conditions. In such constructions, the conveying assembly 60 will remain in the selected condition until a user manually activates the power switch to change the condition or may automatically power off after a predetermined period of inactivity. The power switch can be an independent component (i.e., button, switch, or other activation device) or can be part of another component of the device 20, such as a volume control 124 (discussed below).

In yet other constructions, the educational device 20 can include a switch (not shown) positioned in the feed channel 40 which is physically engagable by objects 36 fed into the feed channel 40. Upon engagement of the objects 36 with the switch, the conveying assembly 60 changes from the deactivated condition to the activated condition to convey the objects 36 through the housing 24. In such construction, the conveying assembly 60 can be changed from the activated condition to the deactivated condition in manners similar to the previously described constructions. For example, the educational device 20 may include a second similar switch (not shown) located near the outfeed end 56 of the feed track. Upon the second switch being disengaged by the last object 36, the conveying assembly 60 changes to the deactivated condition. Alternatively, a timing sequence similar to the timing sequence described above can be utilized once the last object 36 disengages the switch located near the infeed end 52 of the feed channel 40.

In still other constructions, the device 20 may use any of the activation methods described above to place the device 20 in the activated condition and may change to the deactivated condition when the OCR device 28 no longer senses objects 36. In such a construction, the OCR device 28 sends a signal to the CPU 104, which initiates a timing sequence similar to those discussed above. When the timing sequence terminates, the device 20 changes to the deactivated condition. Alternatively, instead of the absence of objects 36 as the trigger for the timing sequence, blank objects 36 having no indicia thereon could be fed past the OCR device 20 to initiate the timing sequence. Again, the device 20 changes to the deactivated condition after termination of the timing sequence.

Figure 13:
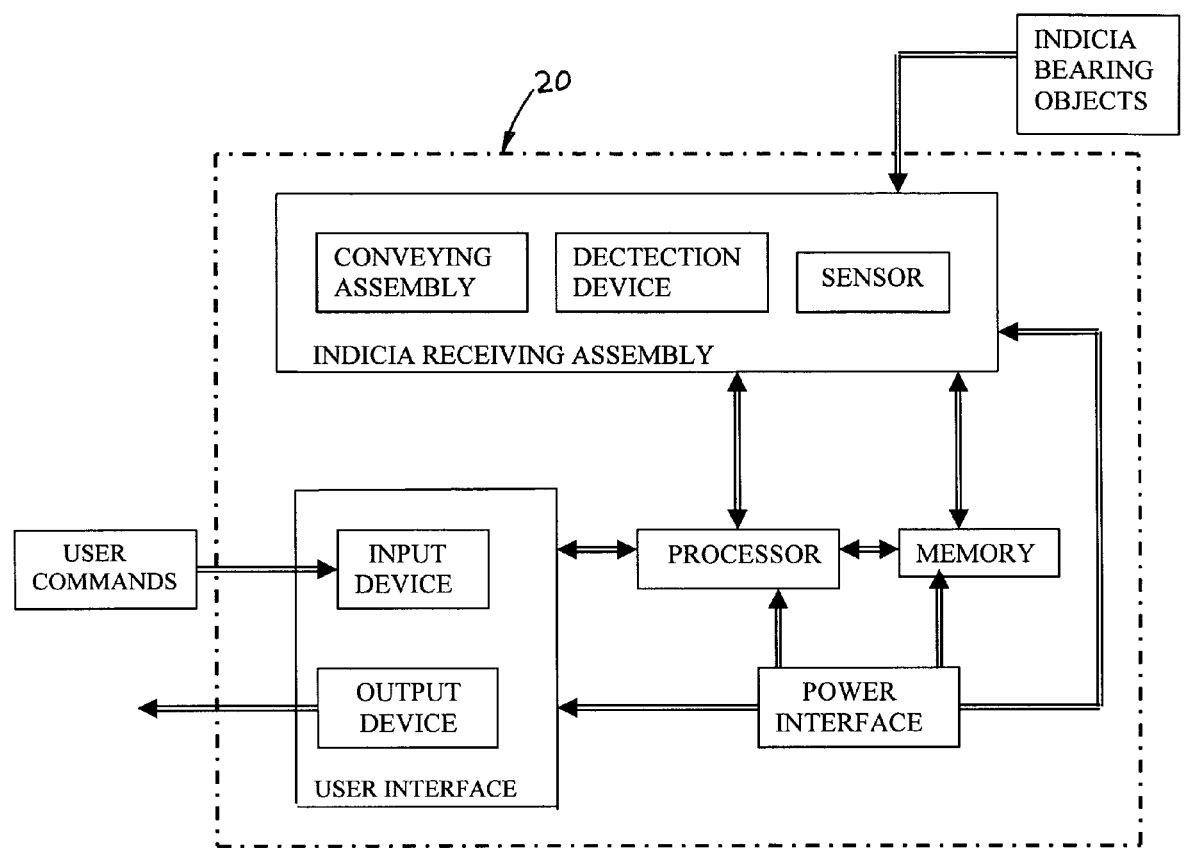
FIG. 13 is a block diagram of an example of the educational device and various components thereof.

With reference to FIG. 13, a block diagram illustrating an example of the functional relationship among the components of the educational device 20 is shown. In general, the educational device 20 includes an indicia recognition assembly, a user interface, a processor, memory, and a power interface.

The indicia receiving assembly may receive the objects 36, detect, read, or optically recognize the indicia 32 on the objects 36, and transport the objects 36 into, through, and out of the educational device 20.

The user interface generally serves as an interface between a user and the educational device 20. The user interface may reside remotely or, as shown in FIG. 13, in the housing of the device 20. The user interface may be in communication with the processor (as shown in FIG. 13) and/or the other components of the character display device 20 in any combination using any type of electromagnetic communications via any type of electromagnetic channel or network.

The user interface may include an input device and an output device. The output device may be any type of visual, manual, audio, electronic or electromagnetic device capable of communicating information from a processor or memory to a person or other processor or memory. Examples of output devices include, but are not limited to, monitors, speakers, liquid crystal displays, networks, buses, and interfaces. The input device may be any type of visual, manual, mechanical, audio, electronic, or electromagnetic device capable of communicating information from a person, or memory to a processor or memory. Examples of input devices include keyboards, microphones, voice recognition systems, trackballs, mice, networks, buses, and interfaces. Alternatively, the input and output devices may be included in a single device such as a touch screen, computer, processor or memory coupled with the processor via a network. The user interface and the indicia recognition assembly, separately or in any combination, may further include one or more processors and one or more computer-readable memory. The memory may be any type of fixed or removable digital storage device and, if needed, a device for reading the digital storage device including, floppy disks and floppy drives, CD-ROM disks and drives, optical disks and drives, hard-drives, RAM, ROM and other such devices for storing digital information. The memory may also store software programs that provide digital instructions to the processor. The processor may be any type of device or devices used to process digital information.

The power interface receives electrical power from a source such as a battery or electric outlet and communicates the power to the various components of the educational device 20. The power interface may include a chamber and contacts for receiving power from a battery. Alternately or in addition, the power interface may include connections for receiving a power cord with a plug designed to conduct electrical power to the power interface.

Figure 13A:
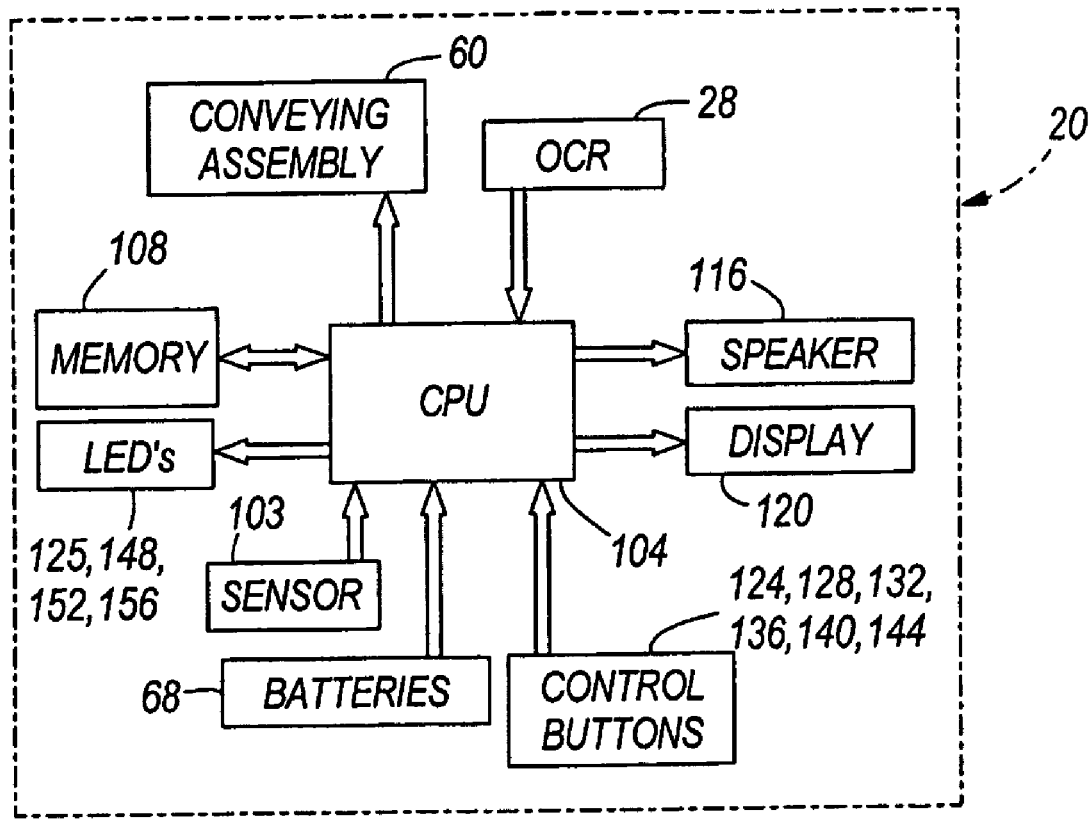
FIG. 13A is a block diagram of an example of the educational device and various components thereof.
Figure 16A:
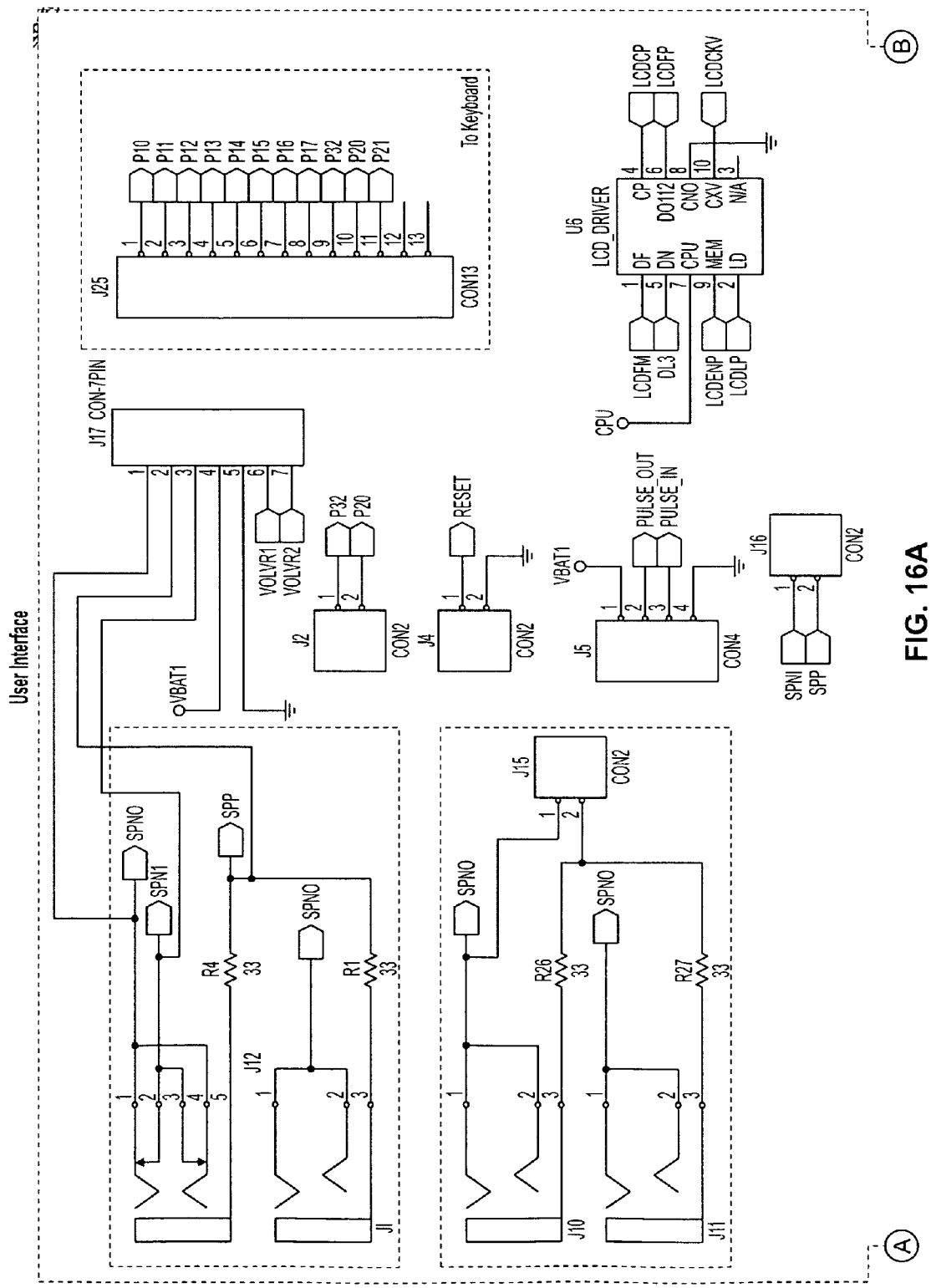
FIGS. 16A-16J illustrate circuitry diagrams associated with the educational device.
Figure 16B:
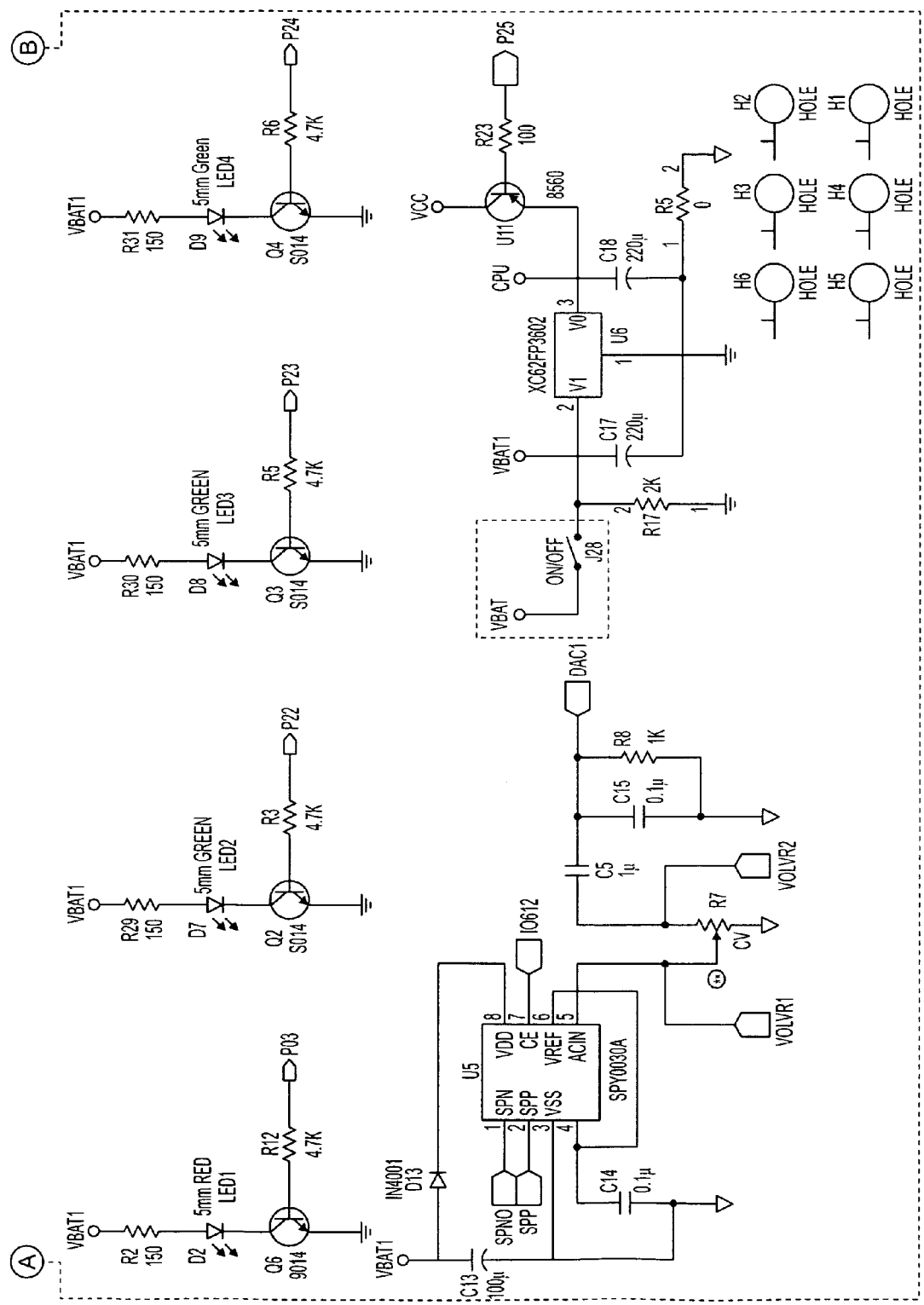
Figure 16C:
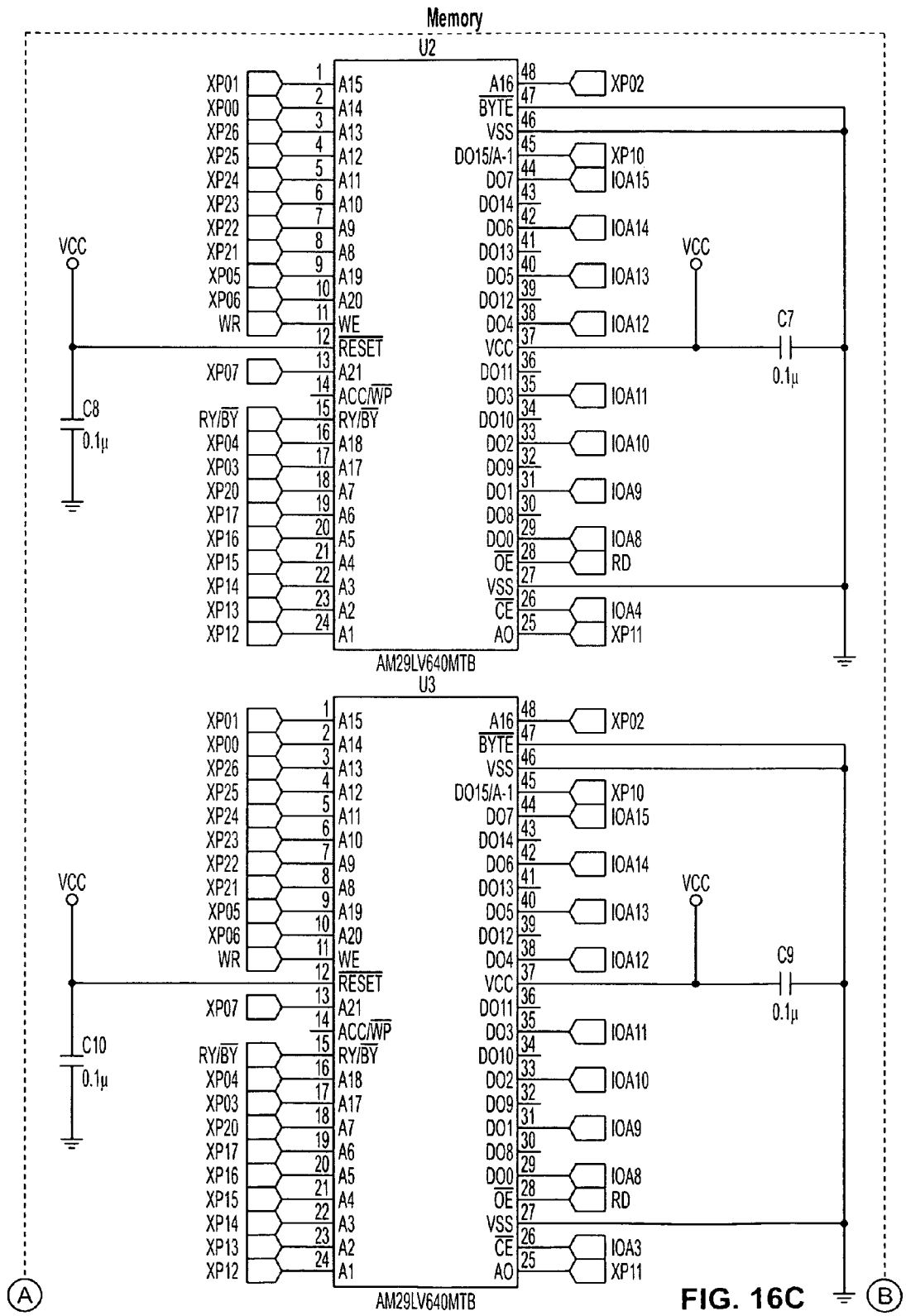
Figure 16D:
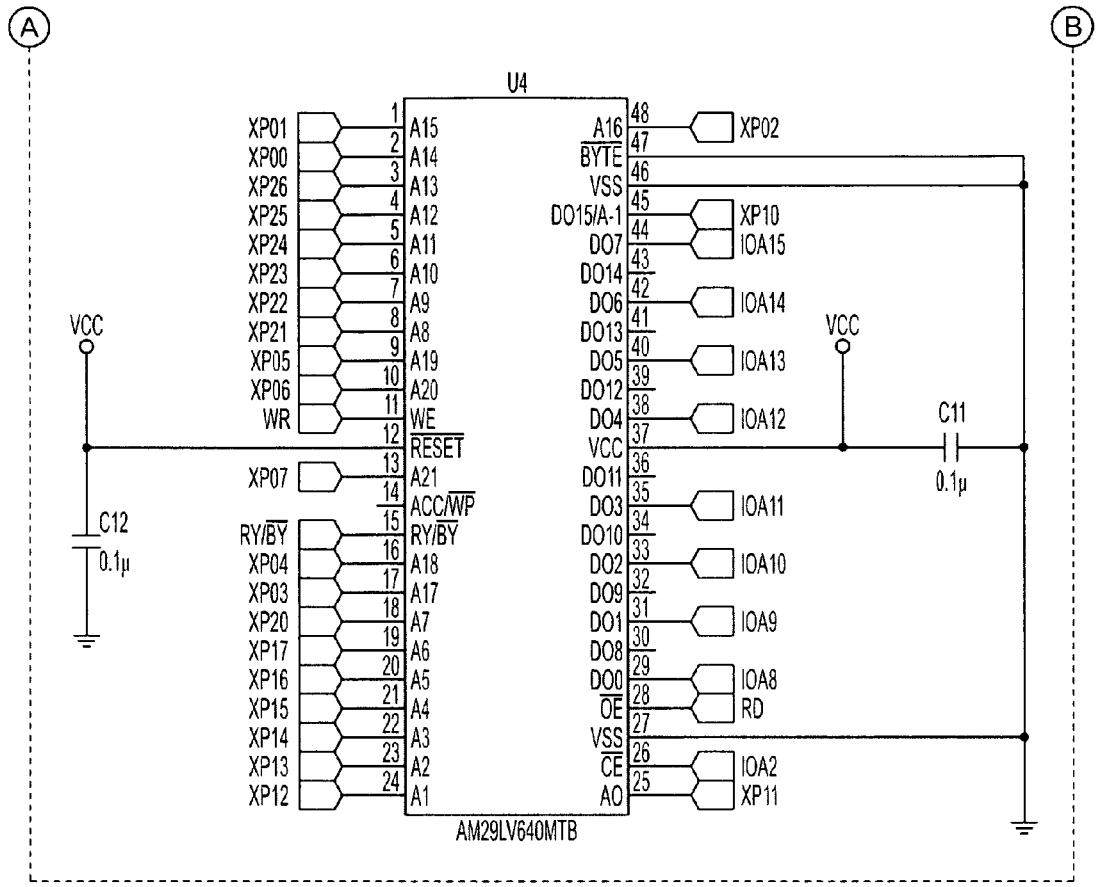
Figure 16E:
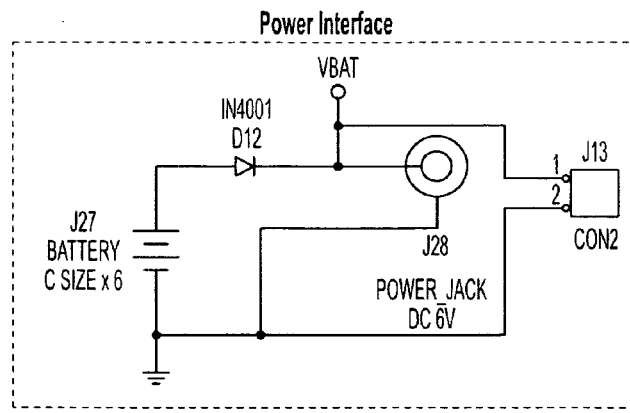
Figure 16F:
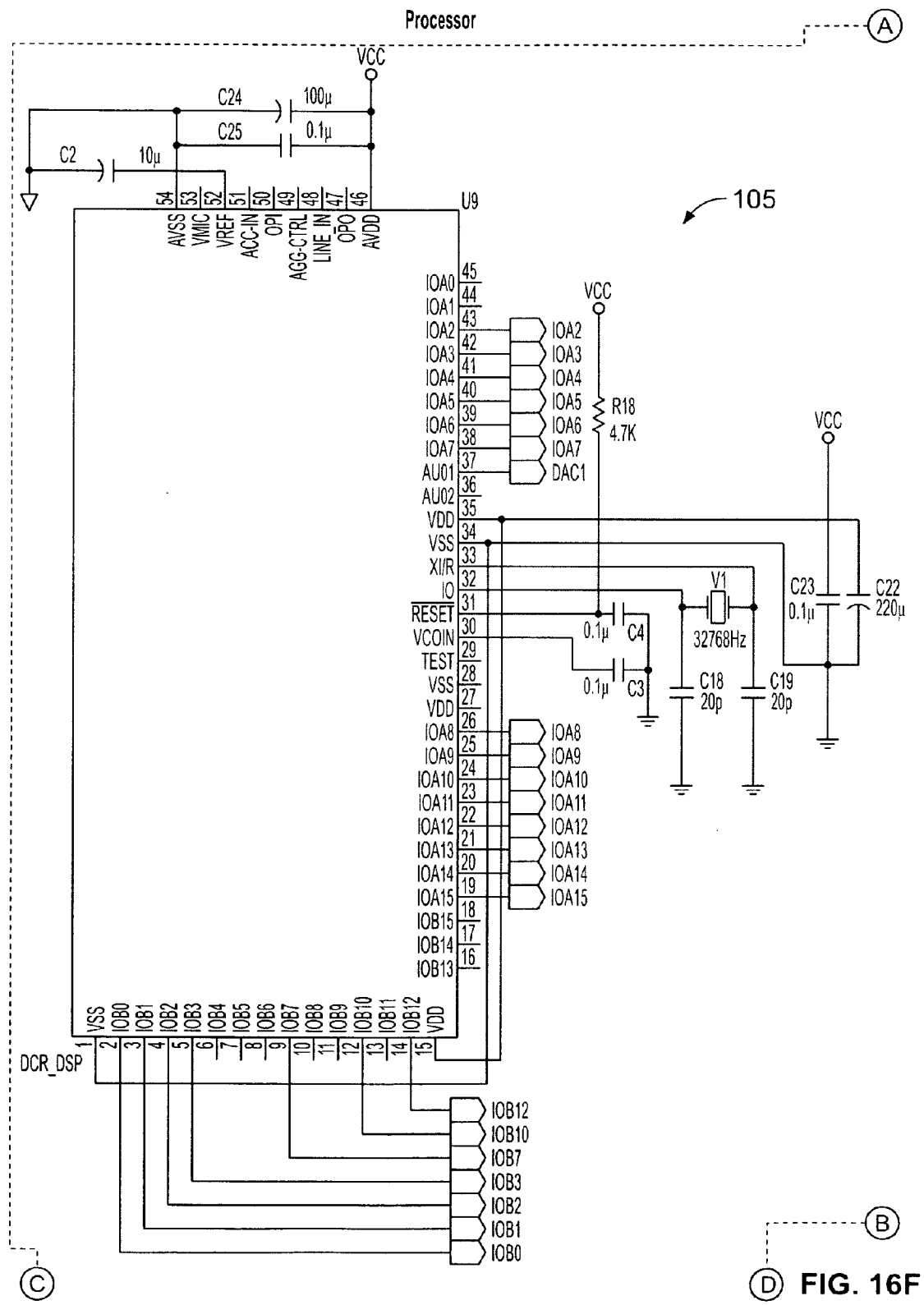
Figure 16G:
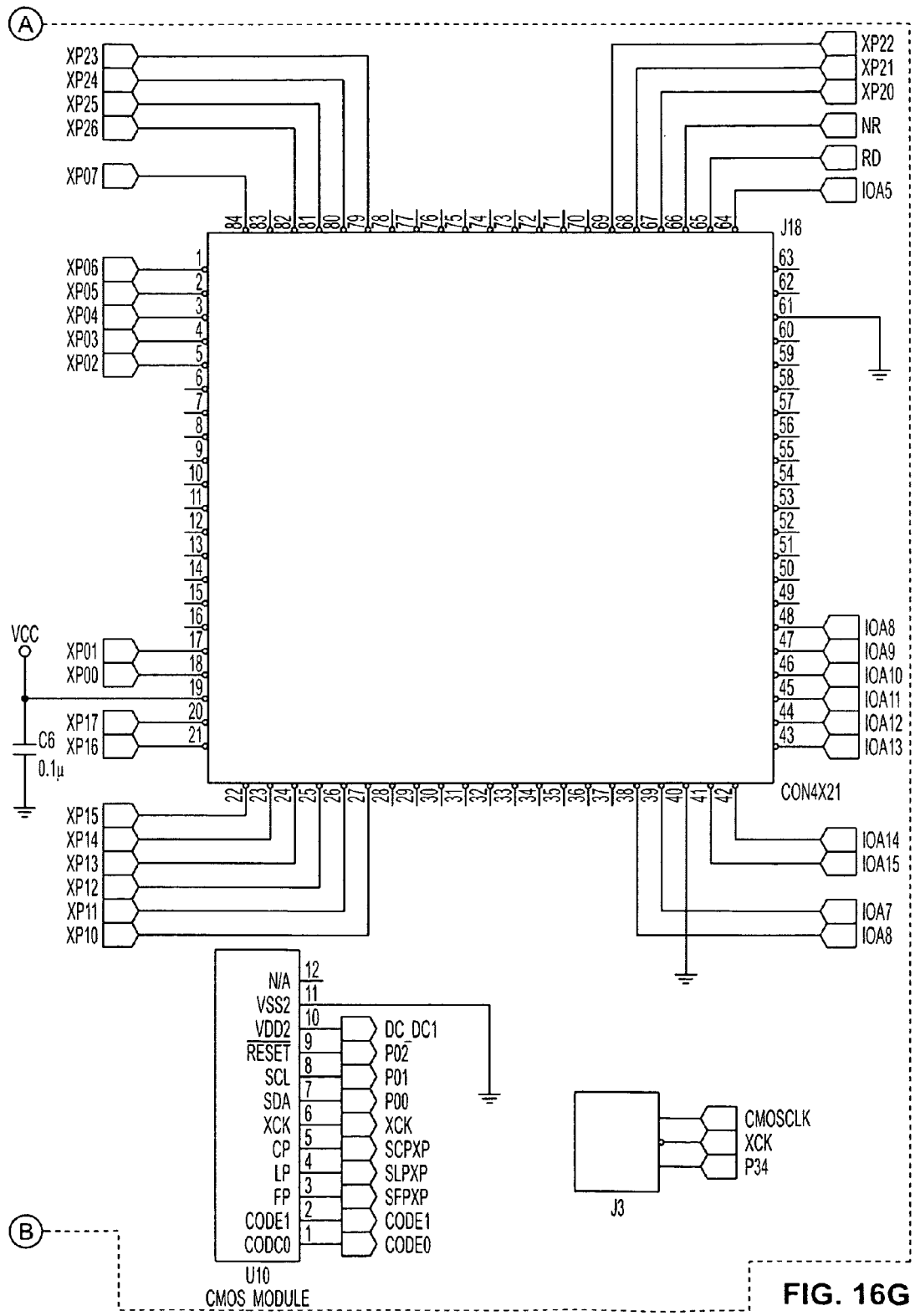
Figure 16H:
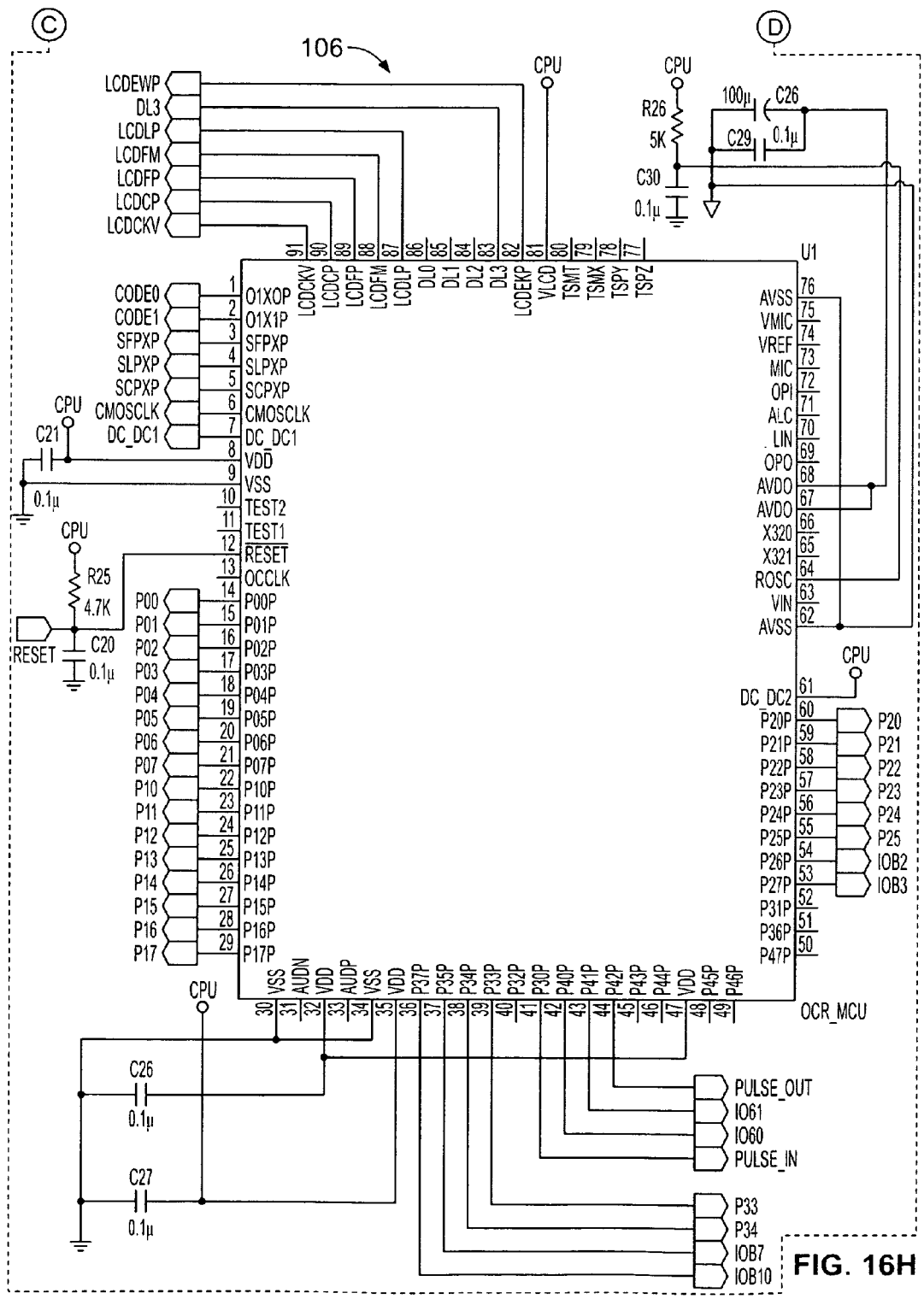
Figure 16I:
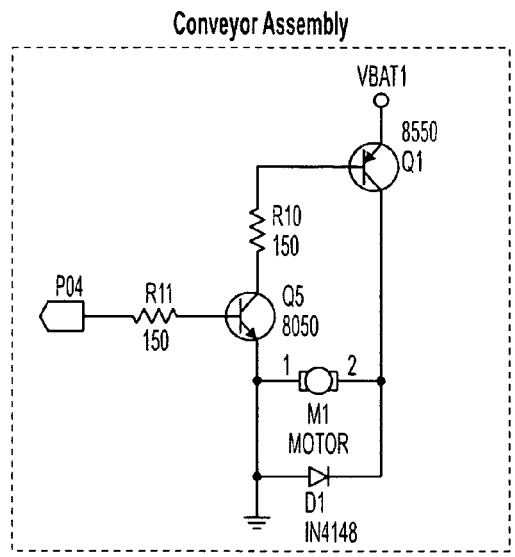
Figure 16J:
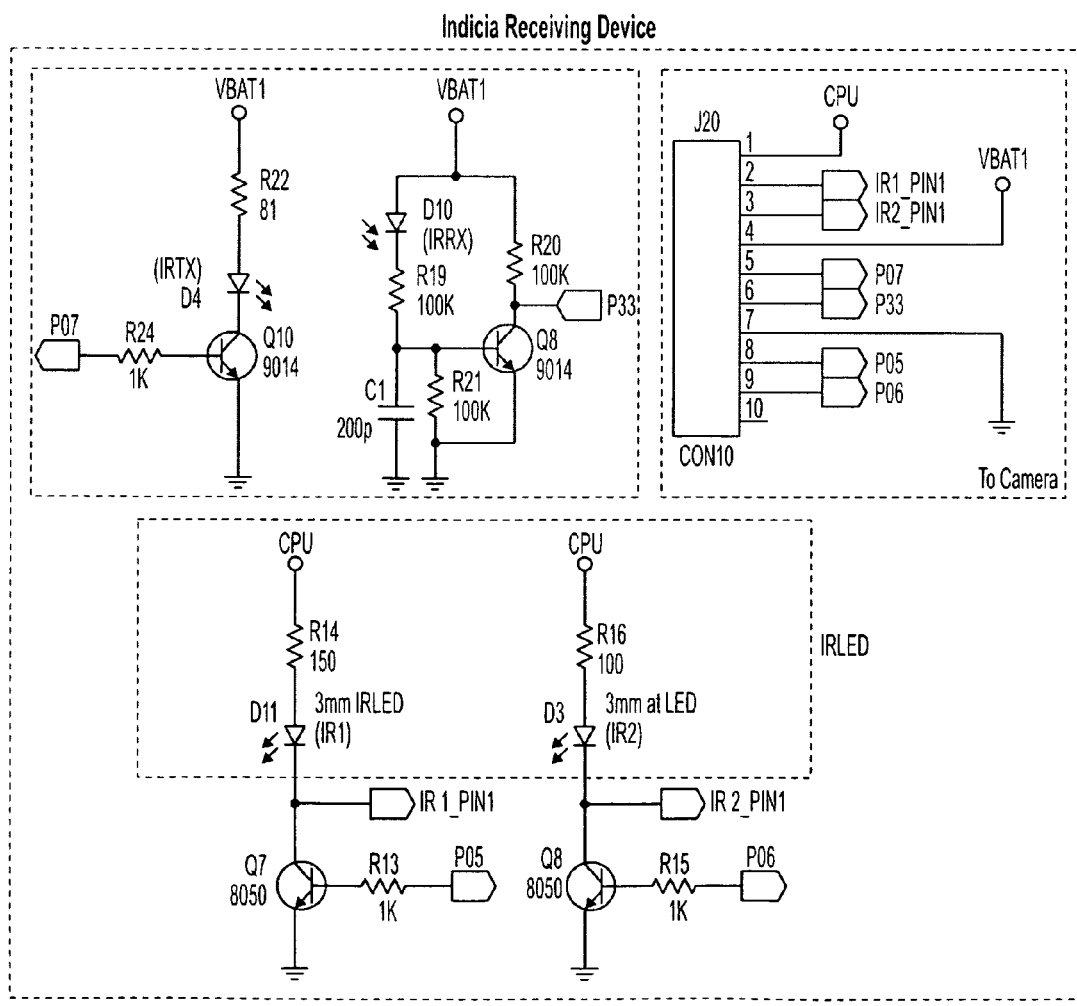
Figure 18:
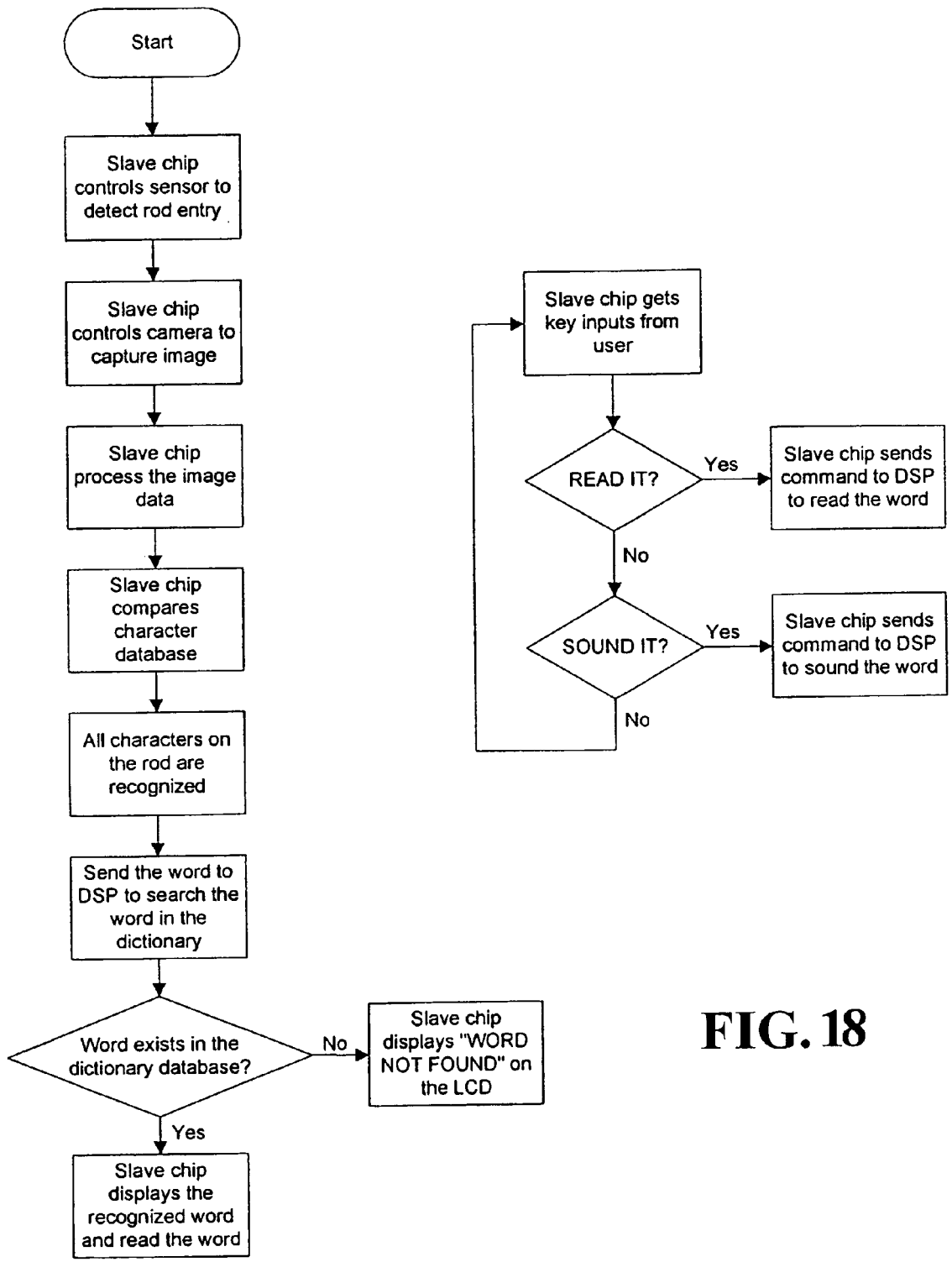
FIG. 18 is a flow chart of information processing of a host DSP and a slave chip of the educational device.

FIG. 13A is a block diagram illustrating another example of the functional relationship among the components of the educational device 20. The educational device 20 includes a central processing unit ("CPU") 104 in electrical communication with various components of the educational device 20 for controlling operation of the educational device 20. The CPU 104 includes a host digital signal processor ("DSP") 105 and a slave chip 106. FIGS. 16A-16J illustrate circuitry diagrams associated with the educational device 20 and include the host DSP 105, the slave chip 106 and variety of other electrical components. For example, FIGS. 16A and 16B illustrate circuitry associated with a user interface, FIGS. 16C and 16D illustrate circuitry associated with memory, FIG. 16E illustrates circuitry associated with a power interface, FIGS. 16F-16H illustrate circuitry associated with a processor, FIG. 16I illustrates circuitry associated with a conveyor assembly, and FIG. 16 illustrates circuitry associated with an indicia receiving device. FIG. 18 is a flowchart illustrating information processing of the host DSP 105 and the slave chip 106.

The host DSP 105 can be a variety of DSP's such as the SPCA56x manufactured by Sunplus of Taiwan, the TMS320DA255 manufactured by Texas Instruments, and the ARM chip LH79524 manufactured by Sharp. The slave chip 106 can be a variety of chips such as the SPL16256A manufactured by Sunplus of Taiwan. The CPU 104 is in communication with memory 168, the conveying assembly 60, the OCR device 28, the sensor 103, a speaker 116 (discussed in greater detail below), an LCD display 120 (discussed in greater detail below), and a plurality of control buttons (discussed in greater detail below).

The educational device 20 automatically synchronizes the reading speed of the OCR device 28 with the motor speed of the conveyor assembly 60. This synchronization ensures proper OCR reading of the indicia present on the objects 36 and maintains performance of the educational device 20 over time as the motor 64 wears out and slows down. The educational device 20 includes software stored in memory that monitors a step counter coupled to the motor 64. The step counter operates in a pulse signal count manner, which includes the processor monitoring the number of pulses per centimeter of travel of the conveyor belt 100. For example, if the processor monitors thirty pulses per centimeter of travel of the belt 100, then the processor operates the OCR device 28 at an appropriate reading speed to optically recognize all the indicia on the objects 36 passing the OCR device 28.

The educational device 20 also includes a plurality of headphone jacks 122 for receiving headphone adapters to allow several users to utilize the educational device 20 simultaneously. The educational device 20 can be configured to include any number of headphone jacks 122; however, in the illustrated construction, the educational device 20 includes four headphone jacks 122. In some constructions, inserting one of the headphone adapters into a particular one of the headphone jacks 122 will disable the speaker 116 to prevent sound emission from the speaker 116 and only allow sound emission from within the headphones. In such constructions, insertion of the other headphone adapters into their respective jacks 122 will not disable the speaker 116. Inserting a headphone adapter into at least one of the other headphone jacks 122 that do not disable the speaker 116 and not inserting a headphone adapter into the speaker disabling headphone jack will cause audio to emit from both the speaker 116 and from the headphones. Any number of the headphone jacks 122 may be speaker disabling headphone jacks and still be within the spirit and scope of the present invention. Also, external speakers (not shown) can be connected to and powered by the device 20 by inserting connectors of the external speakers into the headphone jacks 122. By connecting external speakers to the device 20, the device 20 can broadcast to more users than with headphones or with the speaker 116 alone.

Figure 14A:
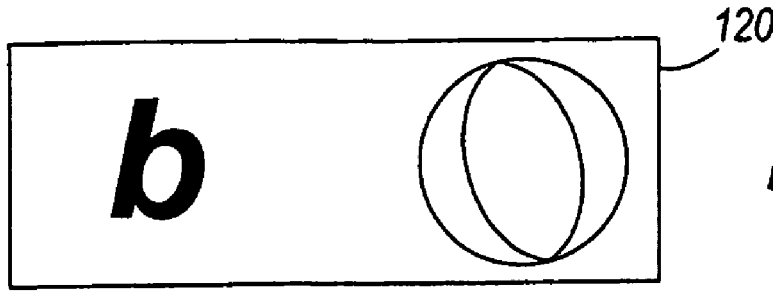
FIGS. 14A-14D are examples of graphics displayed on the educational device shown in FIG. 1 showing illustrations of Letter mode.

Referring back to FIGS. 1-6 and with further reference to FIG. 14A, the display 120 is operable to display characters that are optically recognized by the OCR device 28. The OCR device 28 scans an object 36 and produces an image data structure with its image display and conversion software. The image data structure is sent to the CPU 104, which converts the image data structure to an output data structure. The CPU 104 then sends the output data structure to the appropriate output device (i.e., the speaker 116 or the display 120). For example, if an object 36 including the letter "b" on a surface thereof is fed through the feed channel 40 and into the reading position of the OCR device 28, the OCR device 28 will optically image and send the letter "b" to the CPU for interpretation. The CPU 104 interprets the letter "b" by comparing the letter "b" to stored images in memory. The CPU 104 recognizes the letter "b" when the CPU 104 concludes that the letter "b" matches a letter "b" image in memory. The CPU 104 then sends a signal to the display 120 so that the letter "b" will appear on the display 120 and sends a signal to the speaker 116 so that the letter "b" will be pronounced. In some constructions, in addition to the letter "b" appearing on the display 120, the CPU will send instructions for a graphic of an article beginning with the letter "b" to appear on the display 120, such as, for example a picture of a ball or a banana. The CPU 104 could send instructions to the display 120 for other things to appear or be linked to the scanned letters, such as words, sentences, audible files, etc. The CPU 104 can also perform spell checking or mis-reading functions that occur after the OCR device 28 scans the object 36. These functions can determine if the information scanned from the object 36 is misspelled or has been mis-read. In some constructions, the CPU 104 can automatically replace misspelled or mis-read information from the object 36 with the proper information. For example, if a word "snow" is scanned and the OCR device 28 mis-reads the word to be "snaw", the CPU 104 will search for words similar to the mis-read word. In this example, the CPU 104 will find the word "snow" and assume that the word "snow" was fed into the device and not "snaw". In summary, CPU 104 performs processing operations including receiving data from the OCR device 28, interpreting that data, and sending signals to the output devices including the speaker 116 and the display 120.

It will be understood that any number of characters can be displayed on the display 120 after scanning the object 36 in addition to the example set forth above, and still be within the spirit and scope of the present invention. The OCR data file is used by the display software to display a text-based representation of the optical scan. The OCR data file is also used by speech synthesis software to synthesize speech. Thus, the apparatus displays an image representation of optically scanned text to visually associate the constructed letters, words, sentence and other language elements on the display with the audibly pronounced words.

With continued reference to FIGS. 1-6, the educational device 20 includes a volume control 124 that can double as an ON/OFF power switch, a power light emitting diode ("LED") 125 that indicates whether the device 20 is on or off, a contrast control 126 for controlling the contrast of the display 120, a "READ IT" button 128, a "SOUND IT" button 132, a "LETTER" button 136, a "WORD" button 140, and a "SENTENCE" button 144. Each of the buttons are controllable by a user to activate or perform a respective operation of the educational device 20. Such operations will be discussed hereinafter. Each button has a color-coded icon thereon to permit various non-English-speaking users, special needs users or younger children who have no reading skills to use the buttons.

The educational device 20 includes a Letter mode corresponding to the "LETTER" button 136, a Word mode corresponding to the "WORD" button 140, and a Sentence mode corresponding to the "SENTENCE" button 144. Light emitting diodes ("LED's") 148, 152, 156, respectively, are positioned near each of the three mode buttons and are lit one at a time to identify which mode is active. A desired mode is activated by a user depressing the button corresponding to the desired mode. The device 20 must be powered-on and a mode selected prior to scanning.

The educational device 20 is operable to identify, interpret, display and pronounce, numerous characters, words, sentences, etc., that are fed through the feed channel 40. The educational device 20 has a large number of characters and words stored in a dictionary database. Each character and word has an associated (linked) file which indicates how the characters and words are to be pronounced. In one construction, the pronunciation of characters and words can be based upon the Carnegie Mellon University Pronunciation Dictionary ("C-M dictionary"). Alternatively, variations can be made to the pronunciations of the C-M dictionary, or other commonly recognized sources can be used as a basis for the desired pronunciation. The C-M dictionary is a machine-readable pronunciation dictionary for North American English that contains over 125,000 words and their pronunciations. There are 39 phonemes which are incorporated into the C-M dictionary which comprises all the sounds in the English language under that system. Thus, the dictionary includes a pronunciation guide for each word. It should be understood that alternative resources can be used with the device 20 for determining pronunciation of words. It should also be understood that alternative resources can be used with the device 20 to compensate for different dialects and for languages other than English.

Numerous words have been separately pre-recorded and each of these words are stored individually as sound files in the database within the device 20 so that the pronunciations of these words are spoken renditions of the words. For the other words not pre-recorded in their entirety, the 39 phonemes are pre-recorded individually and are assembled to form the other words for pronunciation of those words. These 39 phonemes are saved individually so that they can be called upon when needed to form part of a word.

All "blocked words" (e.g., obscenities and other excluded words) are also included in the dictionary. "Blocked words" are words that the device 20 is not permitted to display, sound out loud or include in sentences (in Sentence mode). Upon initial feeding of objects containing a blocked word into the device 20, the display 120 will show "Word Not Found" and a negative beep will be produced by the speaker 116. In the "READ IT" operation with blocked words, the speaker 116 will produce a negative beep and the display 120 will show an asterisk for each character of the blocked word. There is no permitted pronunciation of blocked words in any mode. Blocked words will not appear on the LCD display 120 in any mode at any time. They will likewise never be sounded out in SOUND IT mode (letter by letter, phoneme by phoneme, or otherwise). Thus, there is only one database of words which includes all three varieties of words (recorded, not recorded and blocked).

In addition, the educational device 20 focuses on sounds, that is, the educational device 20 is not parsing words by their phonic elements, but instead by phonemes as are found in a dictionary pronunciation guide. As indicated above in some constructions, the educational device 20 utilizes the C-M dictionary for the 39 phonemes (sounds) that all English words are made from.

The educational device 20 is self-contained and portable, and does not rely on a personal computer ("PC") or other devices dependent on a computer, such as, for example a computer monitor, a hard drive, an external keyboard, an external mouse, etc. PC's are often highly demanded in a class room or other educational center and by providing a self-contained and portable educational device 20, activity is diverted away from the PC, therefore allowing the PC to be used for other activities, such as, for example word processing, Internet research, etc.

The device 20 allows teachers to leverage themselves in a classroom with large numbers of children. When there are too few adults available to instruct or assist the children in the classroom or when the teacher must devote individual attention to a small group of children, the other children can use the device 20 for answering pronunciation questions or to determine if they have completed their work correctly. In that sense, the device 20 allows children to self-check, which is both self-satisfying to children, as well as a management tool for large classrooms. Interest may be stimulated by the device 20 as the objects 32 move under the OCR device 28 and are automatically (or "magically" as may be perceived by a child) identified by the device 20. A child's enthrallment with the device 20 may stimulate greater interest in working on important reading skills.

The educational device 20 can be used to teach reading and pronunciation of a large variety of words. The device 20 also is operable to read and sound out all "sight words". The educational device 20 can be used by a wide variety of users in addition to mainstream learners of reading in pre-K-$2^{nd}$ grade, such as, for example, children and adults who don't speak the audible language of the educational device 20 as a first language (e.g., people who learn English as a second language or people learning English as a foreign language). In cases where people do not speak the audible language of the educational device 20, the educational device 20 can be used to learn the sound of and to practice critical vocabulary such as "I need to use the bathroom" or "I need to make a telephone call". The broad dictionary in the device 20 considerably adds value for this use. Also, the educational device 20 can be used by speech experts to teach reading and pronunciation to their clients. Special needs children and adults can also benefit from this device. People with learning disabilities such as, for example, dyslexia, stroke-induced complications, or other special needs individuals can work independently and at their own pace to learn essential reading skills with unusual flexibility and effectiveness. Color-coded buttons assist teachers who work with non-English speaking, pre-reading or disabled children and/or adults in making the use of the device 20 easier and more intuitive. The design of the device 20 is meant to be easy and intuitive for the most basic and unsophisticated users who should be able to master the operation with only the most basic instruction and background.

Throughout the world, users with learning disabilities are often mainstreamed into regular classrooms. Teachers have the challenge of helping not only the English speaking users who are of normal ability and grade level, but also users who are disabled in various ways or lack the basic language skills necessary to acquire the requisite content. The device 20 can greatly assist the teacher who is trying to manage and balance the various needs of users having greatly varied capabilities. The device 20 is also good for accelerated learners or users above normal ability. The device 20 allows the user to go at his or her pace, whether ahead or behind the class.

Another factor to consider is the No Child Left Behind Act (NCLB) which has created tremendous administrative and regulatory pressure in the United States on teachers to bring all children up to state-mandated reading levels, or risk suffering various sanctions which can include school closures under certain circumstances. NCLB also requires documentation of achievement of various skills by grade. These requirements apply additional pressures to the teachers. The device 20 can greatly aid in achieving these legal requirements in an environment not adequately set up for teacher success.

Now that some of the features and aspects of the device 20 have been described, operating modes will be described hereinafter.

It should be understood that the various modes described herein are only some manners of operating the device 20 and that the manners of operation of the various modes can include a variety of alternatives and variations to that described and still be within the spirit and scope of the present invention.

Letter Mode

The Letter mode of operation of the educational device 20 as it relates to the various modes will be discussed herein. It should be understood that the Letter mode described herein is only one manner of operating the device 20 in a Letter mode and that the manner of operation of the Letter mode can include a variety of alternatives and variations to that described and still be within the spirit and scope of the present invention. One of ordinary skill in the art will be able to recognize such alternatives and variations from the disclosure hereof and, therefore, such alternatives and variations are within the spirit and scope of the present invention.

Figure 14B:
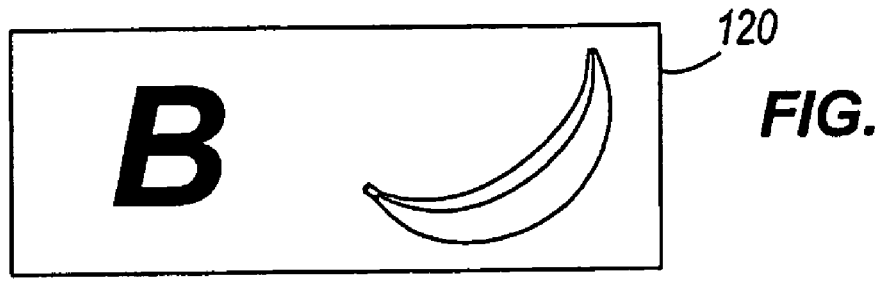

Letter mode is activated by depressing the "LETTER" button 136, which will cause the LED 148 corresponding to the Letter mode to illuminate. An object 36 displaying a single letter is introduced into the feed channel 40 and is conveyed to the reading position by the conveying assembly 60. As the object 36 passes through the reading position, the OCR device 28 scans the single letter on the object 36 and relays a signal to the CPU 104, which in turn sends a signal to the display 120 to display the scanned letter (upper or lower case, as applicable) and a graphic of an article beginning with the scanned letter (FIGS. 14A, 14B). The CPU 104 will also send a signal to the speaker 116 to produce audio stating the scanned letter and the article graphically displayed. For example, in Letter mode, if the letter "b" is scanned, the letter "b" and an illustration of a ball is displayed on the display 120, the speaker 116 will produce the audio "bee", followed by the stated word "ball" (see FIG. 14A).

Figure 14C:
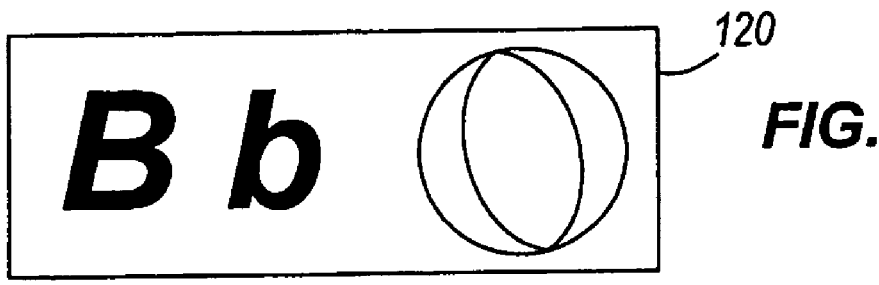
Figure 14D:
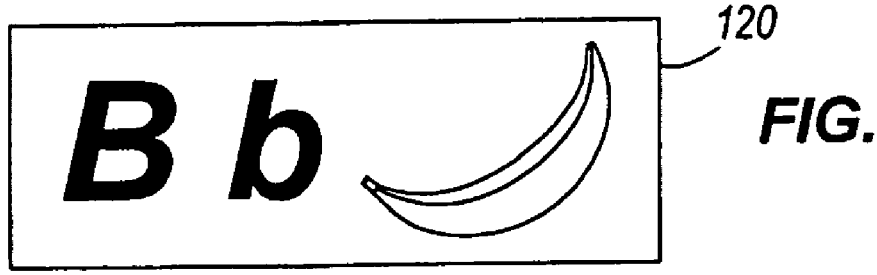

After the initial display and audio produced by the object 36 in Letter mode, the user has several options available. A user may depress the "READ IT" button 128 to hear the letter and pronunciation of the word associated with the corresponding graphic again (see FIG. 14C). In the illustrated construction, both the upper and lower case forms of the letter appear after depressing the "READ IT" button 128. For example, if both the upper and lower case forms of the letter "B" and "b" were displayed with a graphic of a ball, the speaker 116 would produce the audio "bee", followed by the stated word "ball". A user may depress the "SOUND IT" button 132 to see the upper and lower case letter and the graphic associated with the letter and hear the sound of the scanned letter and a statement of the graphic displayed on the display. For example, if the letter "B" and "b" and a ball were displayed on the display 120, the speaker 116 would produce the audio "buh" and state "ball" (see FIG. 14C).

If a user attempts to depress the "READ IT" or "SOUND IT" buttons 128, 132 without scanning an object 36 with a letter thereon, the speaker 116 will produce a negative beep sound. In addition, if a user attempts to scan more than a single letter (i.e., a word or sentence) while in the letter mode, the speaker 116 will produce a negative beep sound.

Word Mode

The Word mode of operation of the educational device 20 as it relates to the various modes will be discussed herein. It should be understood that the Word mode described herein is only one manner of operating the device 20 in a Word mode and that the manner of operation of the Word mode can include a variety of alternatives and variations to that described and still be within the spirit and scope of the present invention. One of ordinary skill in the art will be able to recognize such alternatives and variations from the disclosure hereof and, therefore, such alternatives and variations are within the spirit and scope of the present invention.

Word mode is activated by depressing the "WORD" button 140, which will cause the LED 152 corresponding to the Word mode to illuminate. An object 36 containing a word or a plurality of adjacent objects 36 containing letters thereon or portions of words thereon to form a word (see FIG. 15B) when connected are introduced into the feed channel 40 and are conveyed to the reading position by the conveying assembly 60. In this mode, all of the letters on the object(s) 36, be it one or more, are interpreted to form a single word regardless of the letter combinations on the individual objects 36 or the combination or order of the objects 36. As the object(s) 36 passes through the reading position, the OCR device 28 scans the letters on the object(s) 36 and relays a signal to the CPU 104, which in turn sends a signal to the display 120 to display the scanned word and a signal to the speaker 116 to produce an audio sound of the scanned word.

For example, if a plurality of letters were scanned to form the word "apple", the word "apple" would be displayed on the display 120 and the audio "apple" would be produced by the speaker 116. For some words, a scanned word can have multiple meanings and pronunciations (e.g., "the wind is blowing" or "wind the clock") or a scanned word can have the same meaning, but different pronunciations (e.g., the word pecan pronounced "pec-ah-n" or "pec-aa-n"). In some constructions, the device 20 pronounces the most common pronunciation of the scanned word. In other constructions, more than one pronunciation of the scanned word is pronounced in Word mode.

Also for example, the device 20 recognizes contractions, including apostrophes. If a plurality of letters were scanned to form "can't", the word "can't" would be displayed on the display 120 and the audio "can't" would be produced by the speaker 116.

After the initial display and audio produced by the object 36 in Word mode, the user has a "READ IT" operation and a "SOUND IT" operation available, just as with the Letter mode. To activate the desired operation, a user may depress either the "READ IT" button 128 or the "SOUND IT" button 132. The results of the "READ IT" and "SOUND IT" operations are dependent upon whether the scanned word is a pre-recorded word (pre-recorded in its entirety), a word made of pre-recorded word parts (assembled from the 39 phonemes), a blocked word, or a word not in the dictionary database.

If the scanned word is a recorded word, the scanned word is read out loud in the "READ IT" operation and the image of the scanned word is shown on the display 120. In the "SOUND IT" operation, the scanned word will be phonemically sounded sequentially by individual phoneme and the phonemic portion of the word being sounded will be highlighted on the display 120 as it is being read aloud. For example, if the word "apple" is displayed on the display 120, the speaker 116 would produce the audio "ae" when the "a"

is highlighted, the speaker 116 would produce the audio "puh" when the "pp" is highlighted, the speaker 116 would produce the audio "uhl" when the "l" is highlighted, and speaker 116 will produce the audio "the e is silent" when the "e" is highlighted. In some constructions, the device 20 produces the audio "the e is silent" only when the "e" is at the end of the word, such as in the word "apple," while a word having a silent "e" in the middle of a word, such as "pacemaker," will not produce the audio "the e is silent" when the "e" is highlighted. In other constructions, the audio "the e is silent" can be produced on any silent "e" no matter where the silent "e" falls in a word. In yet other constructions, the device 20 will not produce audio for any of the silent "e's". An object 36 containing a silent "e" may have its own color (e.g., white=absence of sound) so that the silent "e" object 36 is easily identifiable by a user. The above description and alternatives are applicable to other letters that can be silent, such as, for example "p" or "k". It should be understood that other letters or characters could be silent in languages other than English and the same principles apply to such languages.

Highlighting of a character can be achieved in a number of ways, such as, for example the character can be surrounded with a background having a contrasting color to accentuate the character, the color of the character and the color of the background can be switched with one other (i.e., if the character is a dark color and the background is a light color, the character would switch to a light color and the background would switch to a dark color), the size of the character can be altered relative to the other displayed characters, the color of the character can be changed relative to other surrounding characters, the character can be underlined or italicized, the character can flash, etc.

If the scanned word is a non-recorded word but is present in the dictionary database, the scanned word is read out loud from word parts in the "READ IT" operation and the image of the word appears on the display 120. In the "SOUND IT" operation, the scanned word will be phonemically sounded sequentially by individual phoneme and the phonemic portion of the word being sounded will be highlighted on the display 120 as it is being read aloud (as is similarly done for recorded words in the "SOUND IT" operation).

If the scanned word is a blocked word, the phrase "Word Not Found" appears on the display 120 and the speaker 116 produces a negative beep upon initial scanning of the blocked word. In the "READ IT" operation, the display 120 remains "Word Not Found" and the speaker 116 produces a negative beep each time the "READ IT" button 128 is depressed. In the "SOUND IT" operation, the display 120 remains "Word Not Found" and the speaker 116 produces a negative beep each time the "SOUND IT" button 132 is depressed. Alternatively, an asterisk or other appropriate character can be displayed for each character of the blocked word.

If the scanned word is not in the dictionary database (and thus neither recorded nor blocked), the word as scanned appears on the display 120 and the speaker 116 produces no sound. In the "READ IT" operation, the speaker 116 will produce a negative beep and the display 120 will temporarily change from the scanned word to show either the phrase "Word Not Found" or an asterisk for each character of the word and then the display 120 will again show the scanned word. In the "SOUND IT" operation, the speaker 116 produces audio of the scanned, unrecognized word letter by letter with no letter or phonemic groupings and the display 120 displays the scanned word and highlights each letter as it is sounded. This is true whether or not the scanned word is a real word.

A user may utilize a toggle switch 160 having four directional arrows to select a specific letter or group of letters of the word displayed on the display 120. The letter(s) selected by the toggle switch 160 is indicated by highlighting. The "SOUND IT" button 132 can be depressed to hear the phonemic sound of the letter(s) highlighted on the display 120. The highlighted letter(s) will be sounded each time the "SOUND IT" button 132 is depressed. If the highlighted letter(s) is silent, such as the letter "e" in "apple", the speaker 116 will produce the audio "the e is silent" each time the "SOUND IT" button 132 is depressed. After the final letter(s) in the word is highlighted, pressing the right directional arrow on the toggle switch 160 once more will highlight the entire word. If the "SOUND IT" button 132 is depressed while the entire word is highlighted, the educational device 20 will sound the entire word and highlight the corresponding letter as that letter of the word is sounded. Alternatively, the phonemic sound of the highlighted letter(s) of the word will be automatically produced (without pressing the "SOUND IT" button) by toggling through the various letters of the word with the toggle switch 160.

The educational device 20 will produce a negative beep sound if the "READ IT" or "SOUND IT" buttons 128, 132 are depressed when no word has been scanned by the OCR device 28.

The objects 36 can also include indicia 32 that represent abbreviations (e.g., Mr., Mrs., Ave.). Upon scanning, the device 20 will display the abbreviation on the display 120 and the speaker 116 will pronounce the abbreviation non-phonetically (that is, for example, "Mr." is "mister"). In the "READ IT" operation, the abbreviation objects 36 will be recognized properly for what they are and will be pronounced non-phonetically (that is, for example, "Ave." is "avenue"). In the "SOUND IT" operation for abbreviation objects 36, the device 20 can produce a negative beep, read the word again as done in the "READ IT" operation, or make no sound at all.

Sentence Mode

The Sentence mode of operation of the educational device 20 as it relates to the various modes will be discussed herein. It should be understood that the Sentence mode described herein is only one manner of operating the device 20 in a Sentence mode and that the manner of operation of the Sentence mode can include a variety of alternatives and variations to that described and still be within the spirit and scope of the present invention. One of ordinary skill in the art will be able to recognize such alternatives and variations from the disclosure hereof and, therefore, such alternatives and variations are within the spirit and scope of the present invention.

Sentence mode is activated by depressing the "SENTENCE" button 144, which will cause the LED 156 corresponding to the Sentence mode to illuminate. In the described construction of Sentence mode, objects 36 containing indicia 32 of complete words, suffixes, single letters or word endings can be used to form words of a sentence. Any number of objects 36 can be used with the device 20 in the Sentence mode to form a sentence. The objects 36 are introduced into the feed channel 40 and are conveyed to the reading position by the conveying assembly 60. As the objects 36 pass through the reading position, the OCR device 28 scans the letters or words on the objects 36 and relays a signal to the CPU 104, which in turn sends a signal to the display 120 to display the scanned sentence. The CPU 104 will also send a signal to the speaker 116 to produce audio corresponding to the displayed sentence. Each word is highlighted as the corresponding word is sounded. Each time the "READ IT" button 128 is depressed, the educational device 20 will sound and highlight the sentence word-by-word.

The following description is an example of the construction of the device 20 described herein in the sentence mode. In a train of objects 36 fed into the device 20, the indicia 32 of each object 36 is compared against the dictionary database to determine if the indicia 32 is a recognized word. The first object 36 in the train is fed through the device 20 and the indicia 32 thereon is identified as a recognized word. Thereafter, the device 20 compares the indicia 32 on the next object 36 in the train of objects 36 against the dictionary database to determine if that next indicia 32 is a recognized word. In the event that the next indicia 32 on an object 36 is not a recognized word, the device 20 will evaluate whether the unrecognized indicia is part of the prior object 36 (e.g., a second object 36 having the indicia "d" which might be used with a first object 36 containing the indicia "close" to create the word "closed"). The two-object combination is then compared against the dictionary database. If the two-object combination is a word in the dictionary database, then the word is incorporated into the sentence. If the two-object combination is not a word in the dictionary database, then the device 20 considers the second object 36 as an unrecognized word and the display 120 would display an asterisk for each character in the second object 36.

Several rules and examples are provided to demonstrate the above described features of the Sentence mode. In the following examples, a "/" used in a sequence identifies the subsequent indicia 32 as being positioned on a separate object 36 and a "/" used in text displayed on the display 120 represents a space between each word displayed.

The device 20 recognizes when word endings are not appropriate for the preceding word or letters when the combined word and word endings do not match any of the words stored in the database. For example, in a scanned sequence of "bat/d" (a word "bat" followed by the word ending "d"), the device 20 will reject "batd" as a word because "batd" is not stored in the database and the display 120 will show "bat/*".

For each word, the device 20 will combine only a single suffix with a preceding word. That is, in sentence mode, two objects 36 each containing suffix indicia may not be combined into a single word.

Several word endings exist that are considered words in the Word mode, but are not considered words in Sentence mode. Some of these word endings are "ping", "hood", "ion", "den" and "test". Accordingly, in Sentence mode, these word endings will always be joined with the prior scanned object 36 to make a word and will not be a word on their own. Each of these word endings and others may be placed on a single object 36 to decrease the number of objects 36 necessary to create word endings. For example, by putting the word ending "ping" on a single object 36, the device 20 avoids needing two separate objects 36 containing the indicia "p" and "ing" to create the word ending "ping".

The device 20 is also operable to recognize punctuation, such as, for example apostrophes, periods, commas, colons, semi-colons, question marks and exclamation marks, in the Sentence mode. In some constructions, inflection of the audio produced by the speaker 116 varies based on the punctuation used.

In the Sentence mode, all words will appear on the display 120 (subject to the rules and examples described above), unless the word is a blocked word or not recognized. In the "READ IT" operation of the Sentence mode, the display 120 displays an asterisk for each character of a blocked word or non-recognized word and the speaker 116 produces a negative beep if the word is blocked or not recognized by the device 20. In the "SOUND IT" operation, the highlighted word will be pronounced, unless the word is not in the dictionary, in which case the speaker 116 will produce a negative beep and the display will show an asterisk for each character of the blocked or non-recognized word.

In some constructions, the device 20 identifies individual objects 36 by the separation between indicia 32 on the objects 36. Indicia 32 on a single object 36 are evenly spaced, while the separation between the last indicium 32 on one object and the first indicium on the next object 36 is greater than the indicia spacing on a single object 36. Therefore, the indicia spacing between two objects 36 signals to the device 20 that the OCR device 28 is scanning a different object 36. It should be understood that a variety of other manners could be used by the device 20 to identify individual objects 36 and still be within the spirit and scope of the present invention.

As an example of sentence operation, the device 20 scans the sentence "I swim ping fast" from multiple objects 36. Upon initial scanning of the sentence, the device 20 can read out loud "I swim beep fast" and displays "I/swim/****/ fast". In the "READ IT" operation, a user selects, with the toggle switch 160, the word of the sentence desired for reading out loud. The speaker 116 can produce audio corresponding to the selected word. Then the user can select individual letters or phonemes of the selected word and have those individual letters or phonemes read out loud. A user may then move onto another word of the sentenced via the toggle switch 160 and select individual letters or phonemes of the newly selected word. Alternatively in the "READ IT" operation, depressing the "READ IT" button 128 causes the speaker 116 to read out loud the entire sentence. In the "SOUND IT" operation, the toggle switch 160 can be used to highlight individual words in the sentence and the speaker 116 produces audio corresponding to the highlighted word. Alternatively in the "SOUND IT" operation, depressing the "SOUND IT" button 132 causes the speaker 116 to produce audio of the entire sentence ("AY" "S/W/IH/M" "beep" "F/AE/S/T").

A user may use the directional arrows on the toggle switch 160 to highlight a specific word in the sentence. Once the word is highlighted, the "READ IT" button 128 can be depressed to hear the highlighted word or the "SOUND IT" button 132 can be depressed to hear the phonetic sounds of the highlighted word. This process can be repeated as many times as desired and may be performed on any word in the sentence. Depressing the right directional arrow on the toggle switch 160 when the last word in the sentence is highlighted will result in no word being highlighted, and depressing the "READ IT" button 128 will read aloud the entire sentence. Depressing the "SOUND IT" button 132 when no words are highlighted will produce a negative beep sound.

Figure 17:
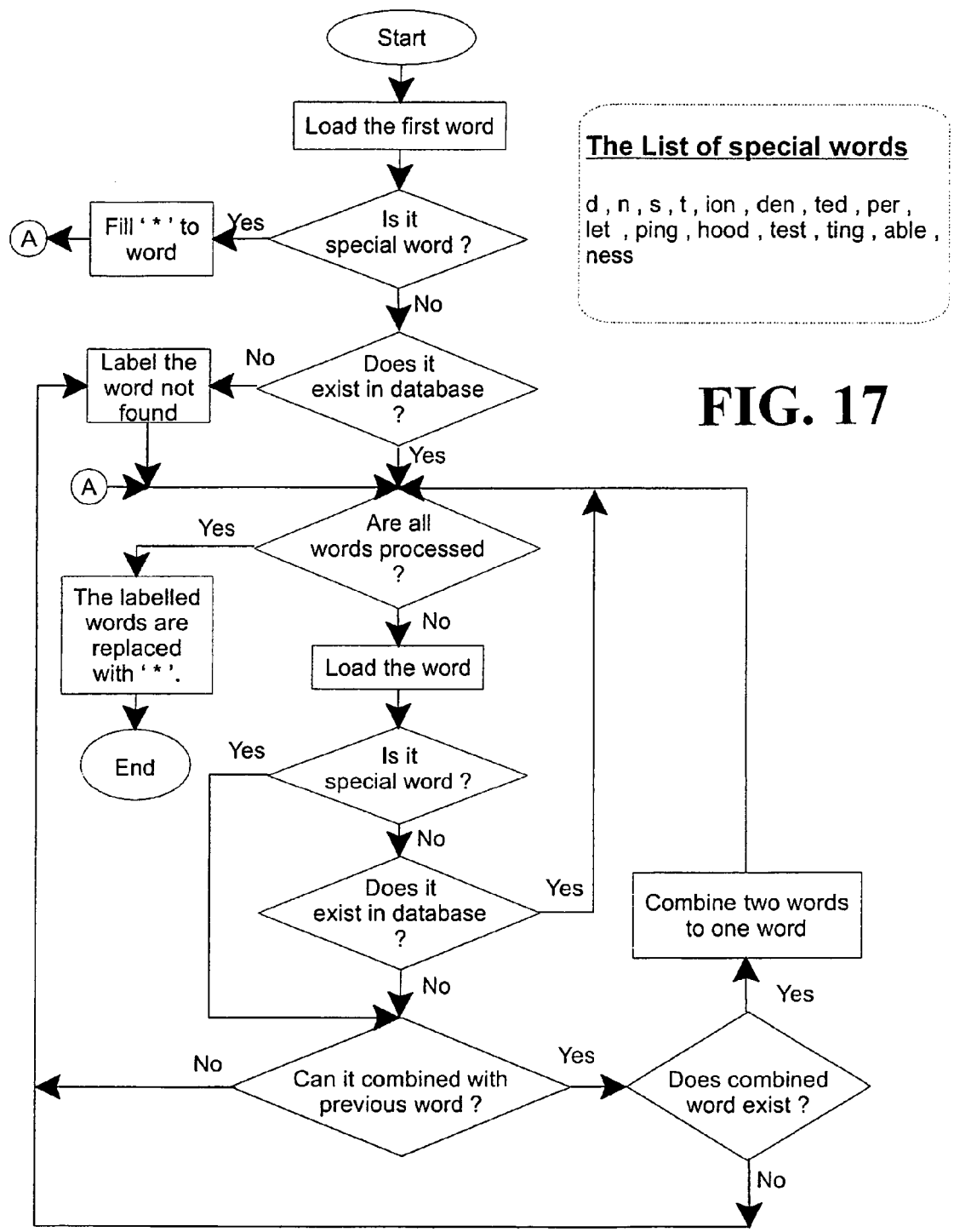
FIG. 17 is a flow chart of a portion of the operations of the educational device in a Sentence mode.

With reference to FIG. 17, a flowchart is illustrated showing a portion of the operations of the educational device 20 in the Sentence mode.

It should be understood that the described embodiments include a large variety of alternatives and variations from the examples discussed above and illustrated in the drawings. One of ordinary skill in the art will be able to recognize such alternatives and variations from the disclosure herein and, therefore, such alternatives and variations are within the spirit and scope of the present invention.

For example, in the Word and Sentence Modes, the speaker 116 may have the option of automatically producing audio corresponding to the scanned object(s) 36 upon initial scanning of the object(s) 36. In such a case, the device 20 may include a "TALK" button that is depressible to activate whether or not the speaker 116 will automatically produce the audio upon initial scanning of the object(s) 36. Turning the automatic audio producing feature on by depressing the "TALK" button will allow the speaker to produce audio upon the initial scanning of the object(s) 36. On the other hand, turning the automatic audio producing feature off by depressing the "TALK" button again, will not allow the speaker 116 to produce audio upon the initial scanning of the object(s) 36. If this feature is off, another button must be depressed, such as the "READ IT" or "SOUND IT" buttons, to have the speaker produce audio corresponding to the scanned object(s) 36.

As another example, the device 20 may have a recording function to enable users to record their pronunciation of particular characters and compare them to the device's pronunciation to facilitate a self-checking function.

As a further example, multiple recordings could be saved in the database for each word, which could increase the fluency of the device 20. That is, words are pronounced differently in different contexts and the device 20 could pronounce the word in the manner intended by its context. For instance, words can have an upward inflection at the end of a question, but not necessarily at the end of a statement. Also, exclamations are usually read with emphasis and altered pacing from statements and questions. This improved fluency would be welcome because users would learn to read more fluently by listening to the intonations, inflection and pacing produced by the device 20 and then mimicking it.

What is claimed is:

1. An educational system comprising:
   an object bearing an indicium readable by a user;
   a housing defining a substantially linear path for the object, the path including an infeed end and an outfeed end;
   a transporter supported by the housing that moves the object along the substantially linear path from the infeed end to the outfeed end;
   an optical character recognition device supported by the housing that optically recognizes the indicium on the object;
   a display supported by the housing that displays the indicium; and
   a processor supported by the housing for reproducing the optically recognized indicium on the display.

2. The educational system of claim 1, wherein the transporter is a conveyor belt for positioning the object relative to the optical character recognition device to permit the indicium on the object to be recognized by the optical character recognition device.

3. The educational system of claim 1, wherein the indicium is a letter.

4. The educational system of claim 1, wherein the indicium is a word.

5. The educational system of claim 1, wherein the indicium is a number.

6. The educational system of claim 1, wherein the object is a first object, the educational device further comprising a plurality of objects including the first object, each of the plurality of objects including an indicium bearing surface bearing an indicium thereon readable by a user, and wherein the optical character recognition device is operable to optically recognize the indicium on each of the indicium bearing surfaces of the plurality of objects.

7. The educational system of claim 6, wherein the processor is operable to reproduce the optically recognized indicium of the plurality of objects on the display.

8. The educational system of claim 6, wherein the indicium-bearing surfaces of a selected group of the plurality of objects are simultaneously visible for optical recognition by the optical character recognition device.

9. The educational system of claim 8, wherein the indicium on each of the indicium bearing surfaces of the selected group of the plurality of objects together form a word.

10. The educational system of claim 8, wherein the indicium on each of the indicium bearing surfaces of the selected group of the plurality of objects together form a sentence.

11. The educational system of claim 8, wherein the selected group of objects are connectable to each other.

12. An educational device comprising:
    a housing having a feed channel defining a substantially linear path, the path including an infeed end and an outfeed end;
    a first object including a first indicium;
    a second object including a second indicium;
    an indicium reader supported by the housing that reads the first indicium on the first object and the second indicium on the second object when the first object and the second object are in a reading position, the first object being connectable to the second object; and
    a transporter supported by the housing that moves the first object and the second object along said feed channel.

13. The educational device of claim 12, wherein the transporter moves the first object and the second object into and out of the reading position.

14. The educational device of claim 12, wherein the indicium reader is an optical character recognition device.

15. The educational device of claim 12, wherein the transporter is a conveyor belt.

16. The educational device of claim 15, further comprising a motor coupled to the conveyor belt for driving the conveyor belt, the conveyor belt being engagable with the first object and the second object to move the first object and the second object toward the reading position.

17. The educational device of claim 12, further comprising a cover at least partially covering the feed channel.

18. A method of teaching and learning reading, the method comprising;
    providing an object bearing an indicium readable by a user;
    providing a self-contained educational device including a housing defining a substantially linear path, the path including an infeed end and an outfeed end, the device also including an indicium reader supported by the housing, a display supported by the housing, and an audio producing device supported by the housing;
    feeding the object into the self-contained educational device along the substantially linear path with a transporter;

reading the indicium of the object with the indicium reader;

audibly pronouncing the indicium of the object with the audio producing device; and displaying the indicium on the display of the self-contained educational device.

19. The method of claim 18, wherein the audio corresponding to the indicium is a phoneme.

20. The method of claim 18, wherein the audio produced is a spoken rendition of the indicium.

21. The method of claim 18, wherein the audio produced is a pre-recorded voice rendition of the indicium.

22. The method of claim 18, wherein the audio produced is a synthesized voice rendition of the indicium.

23. The method of claim 18, wherein the indicium is a letter, and wherein reading includes reading the letter with the indicium reader and displaying includes displaying the letter on the display of the educational device.

24. The method of claim 18 wherein the indicium is a word, and wherein reading includes reading the word with the indicium reader and displaying includes displaying the word on the display of the educational device.

25. The method of claim 18, wherein the transporter is a conveyor belt, and wherein feeding includes feeding the object by the indicium reader with the conveyor belt.

26. The method of claim 18, wherein providing an object includes providing a plurality of objects each bearing an indicium readable by a user, the method further comprising selecting a group of objects from the plurality of objects, selecting an indicium-bearing surface of each of the objects in the selected group, and arranging the selected group of objects such that the selected indicium bearing surfaces are simultaneously visible.

27. The method of claim 26, wherein feeding further includes feeding the selected group of objects into the educational device after arranging the selected group of objects.

28. The method of claim 26, wherein the indicium on each of the selected indicium bearing surfaces together form a word.

29. The method of claim 26, wherein the indicium on each of the selected indicium bearing surfaces together form a sentence.

30. The method of claim 26, further comprising connecting the selected group of objects together before feeding the selected group of objects into the educational device.

* * * * *